US012394355B2

(12) United States Patent
Ka et al.

(10) Patent No.: US 12,394,355 B2
(45) Date of Patent: Aug. 19, 2025

(54) DISPLAY DEVICE AND DRIVING METHOD THEREOF

(71) Applicant: SAMSUNG DISPLAY CO., LTD., Yongin-si (KR)

(72) Inventors: Ji Hyun Ka, Yongin-si (KR); Ki Myeong Eom, Yongin-si (KR); Kyong Hwan Oh, Yongin-si (KR); Hai Jung In, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/608,900

(22) Filed: Mar. 18, 2024

(65) Prior Publication Data

US 2024/0221592 A1 Jul. 4, 2024

Related U.S. Application Data

(63) Continuation of application No. 17/850,894, filed on Jun. 27, 2022, now Pat. No. 11,935,458, which is a (Continued)

(30) Foreign Application Priority Data

Dec. 23, 2019 (KR) ........................ 10-2019-0173279

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2310/0278* (2013.01)

(58) Field of Classification Search
CPC ......... G09G 3/2092; G09G 2310/0267; G09G 2310/0275; G09G 2310/0278;

(Continued)

(56) References Cited

U.S. PATENT DOCUMENTS

| | | | |
|---|---|---|---|
| 10,762,850 | B2 | 9/2020 | Choi et al. |
| 10,796,642 | B2 | 10/2020 | Choi et al. |

(Continued)

FOREIGN PATENT DOCUMENTS

| | | | |
|---|---|---|---|
| CN | 107818761 | A | 3/2018 |
| CN | 108172160 | A | 6/2018 |

(Continued)

OTHER PUBLICATIONS

Chinese Office Action dated Jul. 31, 2024, issued in corresponding Chinese Patent Application No. 202011238560.2, 12 pages.

*Primary Examiner* — Jose R Soto Lopez

(74) *Attorney, Agent, or Firm* — Womble Bond Dickinson (US) LLP

(57) ABSTRACT

A display device includes: a first pixel connected to a first data line and a first scan line; a second pixel connected to the first data line and a second scan line; a first scan driver connected to a first scan start line and the first scan line; and a second scan driver connected to a second scan start line and the second scan line. In a first frame period, the second scan start line is to be supplied with a second scan start signal having a turn-on level, after a first period elapses after a first scan start signal having a turn-on level is supplied to the first scan start line. In a second frame period, a difference between a time at which the first scan start signal having the turn-on level is supplied and a time at which the second scan start signal having the turn-on level is supplied corresponds to a second period. The second period is shorter than the first period.

10 Claims, 24 Drawing Sheets

Related U.S. Application Data continuation of application No. 16/991,860, filed on Aug. 12, 2020, now Pat. No. 11,373,578.

(58) Field of Classification Search
CPC ... G09G 2310/0202; G09G 2310/0286; G09G 2310/08; G09G 2330/021; G09G 2340/0435; G09G 3/3266; G09G 3/32; G09G 3/3225; G09G 2310/06; G09G 2310/0243; G09G 2310/0264
See application file for complete search history.

(56) References Cited

U.S. PATENT DOCUMENTS

| | | | | |
|---|---|---|---|---|
| 10,847,088 | B2 | 11/2020 | Byun et al. | |
| 10,878,749 | B2 | 12/2020 | Lee et al. | |
| 10,923,048 | B2 * | 2/2021 | Handa | H04N 13/344 |
| 11,935,458 | B2 * | 3/2024 | Ka | G09G 3/2092 |
| 2004/0189583 | A1 * | 9/2004 | Park | G09G 3/3677 345/100 |
| 2009/0267878 | A1 * | 10/2009 | Song | G09G 3/3648 345/87 |
| 2013/0293529 | A1 * | 11/2013 | You | G09G 3/20 345/212 |
| 2015/0123964 | A1 | 5/2015 | Lee et al. | |
| 2015/0187313 | A1 * | 7/2015 | Lee | G09G 3/3677 345/100 |
| 2015/0243203 | A1 * | 8/2015 | Kim | G09G 3/2092 345/212 |
| 2015/0302799 | A1 * | 10/2015 | Feng | G09G 3/3233 345/76 |
| 2015/0356925 | A1 * | 12/2015 | Lee | G09G 3/3266 345/212 |
| 2016/0019852 | A1 * | 1/2016 | Kim | G09G 3/3666 345/103 |
| 2016/0093640 | A1 * | 3/2016 | Kawamura | H10D 86/441 257/72 |
| 2016/0284264 | A1 * | 9/2016 | Lee | G09G 3/2092 |
| 2017/0116922 | A1 * | 4/2017 | Jung | G09G 3/3258 |
| 2018/0158409 | A1 * | 6/2018 | Byun | G09G 3/3233 |
| 2018/0197480 | A1 * | 7/2018 | Choi | G09G 3/3266 |
| 2018/0197481 | A1 * | 7/2018 | Choi | G09G 3/3266 |
| 2018/0197482 | A1 * | 7/2018 | Choi | G09G 3/3266 |
| 2018/0218664 | A1 * | 8/2018 | Liao | G09G 3/20 |
| 2018/0240389 | A1 * | 8/2018 | Li | G09G 3/2003 |
| 2018/0330691 | A1 * | 11/2018 | Li | G09G 3/3614 |
| 2019/0088184 | A1 * | 3/2019 | Morein | G06F 3/04166 |
| 2019/0096330 | A1 * | 3/2019 | Kim | G09G 3/3266 |
| 2019/0206302 | A1 * | 7/2019 | Kong | G09G 3/2014 |
| 2019/0206329 | A1 * | 7/2019 | Lee | G09G 3/3677 |
| 2020/0074949 | A1 * | 3/2020 | Morein | G09G 3/3688 |
| 2021/0035488 | A1 * | 2/2021 | Seo | G09G 3/325 |
| 2021/0134215 | A1 * | 5/2021 | Chun | G09G 3/3233 |
| 2021/0358411 | A1 * | 11/2021 | Wen | G09G 3/3258 |
| 2022/0327989 | A1 * | 10/2022 | Ka | G09G 3/2092 |

FOREIGN PATENT DOCUMENTS

| | | | |
|---|---|---|---|
| CN | 108287407 | A | 7/2018 |
| CN | 108305586 | A | 7/2018 |
| EP | 3 264 408 | A2 | 1/2018 |
| KR | 10-0237203 | B1 | 1/2000 |
| KR | 10-0363677 | B1 | 12/2002 |
| KR | 10-2016-0049586 | A | 5/2016 |
| KR | 10-2019-0034375 | A | 4/2019 |

* cited by examiner

DISPLAY DEVICE AND DRIVING METHOD THEREOF

CROSS-REFERENCE TO RELATED APPLICATIONS

This application is a continuation of U.S. patent application Ser. No. 17/850,894, filed Jun. 27, 2022, which is a continuation of U.S. patent application Ser. No. 16/991,860, filed Aug. 12, 2020, now U.S. Pat. No. 11,373,578, which claims priority to and the benefit of Korean Patent Application No. 10-2019-0173279, filed Dec. 23, 2019, the entire content of all of which is incorporated herein by reference.

BACKGROUND

1. Field

The present disclosure generally relates to a display device and a driving method thereof.

2. Description of the Related Art

With the development of information technologies, the importance of a display device which is a connection medium between a user and information increases. Accordingly, display devices such as a liquid crystal display device, an organic light emitting display device, and a plasma display device are increasingly utilized.

Each pixel of a display device may emit light with a luminance corresponding to a data voltage supplied through a data line. The display device may display an image frame by utilizing a combination of lights emitted from the pixels.

A plurality of pixels may be connected to each data line. Therefore, a scan driver is required to provide a scan signal for selecting a pixel to which a data voltage is to be supplied among the plurality of pixels. The scan driver is configured in the form of a shift register, to sequentially provide a scan signal having a turn-on level in a scan line unit.

Clock signals may be provided to control the scan driver. Larger power consumption is required as the frequency of the clock signals becomes higher.

SUMMARY

Aspects of embodiments are directed toward a display device in which the frequency of clock signals is controlled according to the kind of a frame, so that power consumption can be reduced, and to a driving method of the display device.

In accordance with an embodiment of the present disclosure, there is provided a display device including: a first pixel connected to a first data line and a first scan line; a second pixel connected to the first data line and a second scan line; a first scan driver connected to a first scan start line and the first scan line; and a second scan driver connected to a second scan start line and the second scan line, wherein, in a first frame period, the second scan start line is to be supplied with a second scan start signal having a turn-on level, after a first period elapses after a first scan start signal having a turn-on level is supplied to the first scan start line, wherein, in a second frame period, a difference between a time at which the first scan start signal having the turn-on level is supplied and a time at which the second scan start signal having the turn-on level is supplied corresponds to a second period, wherein the second period is shorter than the first period.

In the first frame period, a first scan clock signal supplied to the first scan driver may have a first cycle. In the second frame period, the first scan clock signal may have a second cycle longer than the first cycle.

In the first frame period, a second scan clock signal supplied to the second scan driver may have the first cycle. In the second frame period, the second scan clock signal may have the second cycle.

The display device may further include: a first emission driver connected to a first emission stop line and a first emission line; and a second emission driver connected to a second emission stop line and a second emission line. The first pixel may be connected to the first emission line, and the second pixel may be connected to the second emission line. In the first frame period, the second emission stop line may be supplied with a second emission stop signal having a turn-off level, after a third period elapses after a first emission stop signal having a turn-off level is supplied to the first emission stop line. In the second frame period, a difference between a time at which the first emission stop signal having the turn-off level is supplied and a time at which the second emission stop signal having the turn-off level is supplied may correspond to a fourth period. The fourth period may be shorter than the third period.

In the first frame period, a first emission clock signal supplied to the first emission driver may have a third cycle. In the second frame period, the first emission clock signal may have a fourth cycle longer than the third cycle.

In the first frame period, a second emission clock signal supplied to the second emission driver may have the third cycle. In the second frame period, the second emission clock signal may have the fourth cycle.

The display device may further include a third pixel connected to the first data line and a third scan line which is a next scan line of the first scan line. The third scan line may be connected to the first scan driver. In the first frame period, a difference between a time at which a first scan signal having a turn-on level is applied to the first scan line and a time at which a third scan signal having a turn-on level is applied to the third scan line may correspond to a third period. In the second frame period, the difference between the time at which the first scan signal having the turn-on level is applied and the time at which the third scan signal having the turn-on level is applied may correspond to a fourth period. The fourth period may be longer than the third period.

The display device may further include a fourth pixel connected to the first data line and a fourth scan line which is a next scan line of the second scan line. The fourth scan line may be connected to the second scan driver. In the first frame period, a difference between a time at which a second scan signal having a turn-on level is applied to the second scan line and a time at which a fourth scan signal having a turn-on level is applied to the fourth scan line may correspond to the third period. In the second frame period, the difference between the time at which the second scan signal having the turn-on level is applied and the time at which the fourth scan signal having the turn-on level is applied may correspond to the fourth period.

The display device may further include a fifth pixel connected to the first data line and a fifth scan line which is a previous scan line of the second scan line. The fifth scan line may be connected to the first scan driver. In the first frame period, a time at which a fifth scan signal having a turn-on level is applied to the fifth scan line may be earlier than a time at which the second scan signal having the turn-on level is applied. In the second frame period, the time at which the fifth scan signal having the turn-on level is applied may be later than the time at which the second scan signal having the turn-on level is applied.

A minimum value of the second period may be 0 s, and a maximum value of the second period may correspond to a vertical blank period.

When a number of pixels connected to the first data line between the first pixel and the second pixel is X, and a horizontal period is Y, the first period may correspond to (X+1)*Y.

In accordance with another embodiment of the present disclosure, there is provided a method for driving a display device, the method including: in a first frame period, supplying a first scan start signal having a turn-on level to a first scan start line connected to a first scan driver; in the first frame period, supplying a second scan start signal having a turn-on level to a second scan start line connected to a second scan driver, after a first period elapses after the first scan start signal having the turn-on level is supplied; and in a second frame period which is a next frame period of the first frame period, supplying the first scan start signal having the turn-on level and the second scan start signal having the turn-on level with a time difference of a second period, wherein the second period is shorter than the first period.

In the first frame period, a first scan clock signal supplied to the first scan driver may have a first cycle. In the second frame period, the first scan clock signal may have a second cycle longer than the first cycle.

In the first frame period, a second scan clock signal supplied to the second scan driver may have the first cycle. In the second frame period, the second scan clock signal may have the second cycle.

The method may further include: in the first frame period, supplying a first emission stop signal having a turn-off level to a first emission stop line connected to a first emission driver; in the first frame period, supplying a second emission stop signal having a turn-off level to a second emission stop line connected to a second emission driver, after a third period elapses after the first emission stop signal having the turn-off level is supplied; and in the second frame period, supplying the first emission stop signal having the turn-off level and the second emission stop signal having the turn-off level with a time difference of a fourth period. The fourth period may be shorter than the third period.

In the first frame period, a first emission clock signal supplied to the first emission driver may have a third cycle. In the second frame period, the first emission clock signal may have a fourth cycle longer than the third cycle.

In the first frame period, a second emission clock signal supplied to the second emission driver may have the third cycle. In the second frame period, the second emission clock signal may have the fourth cycle.

The method may further include: in the first frame period, supplying, by the first scan driver, a first scan signal having a turn-on level to a first scan line; in the first frame period, supplying, by the first scan driver, a second scan signal having a turn-on level to a second scan line which is a next scan line of the first scan line, after a third period elapses after the first scan signal having the turn-on level is supplied; and in the second frame period, supplying, by the first scan driver, the first scan signal having the turn-on level and the second scan signal having the turn-on level with a time difference of a fourth period. The fourth period may be longer than the third period.

The method may further include: in the first frame period, supplying, by the second scan driver, a third scan signal having a turn-on level to a third scan line; in the first frame period, supplying, by the second scan driver, a fourth scan signal having a turn-on level to a fourth scan line which is a next scan line of the third scan line, after the third period elapses after the third scan signal having the turn-on level is supplied; and in the second frame period, supplying, by the second scan driver, the third scan signal having the turn-on level and the fourth scan signal having the turn-on level with the time difference of the fourth period.

The method may further include, in the first frame period, supplying, by the first scan driver, a fifth scan signal having a turn-on level to a fifth scan line which is a previous scan line of the third scan line. In the first frame period, a time at which the fifth scan signal having the turn-on level is supplied may be earlier than a time at which the third scan signal having the turn-on level is supplied. In the second frame period, the time at which the fifth scan signal having the turn-on level is supplied may be later than the time at which the third scan signal having the turn-on level is supplied.

BRIEF DESCRIPTION OF THE DRAWINGS

Example embodiments will now be described more fully hereinafter with reference to the accompanying drawings. However, the subject matter of the present disclosure may be embodied in different forms and should not be construed as limited to the embodiments set forth herein. Rather, these example embodiments are provided so that this disclosure will be thorough and complete, and will fully convey the scope of the example embodiments to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
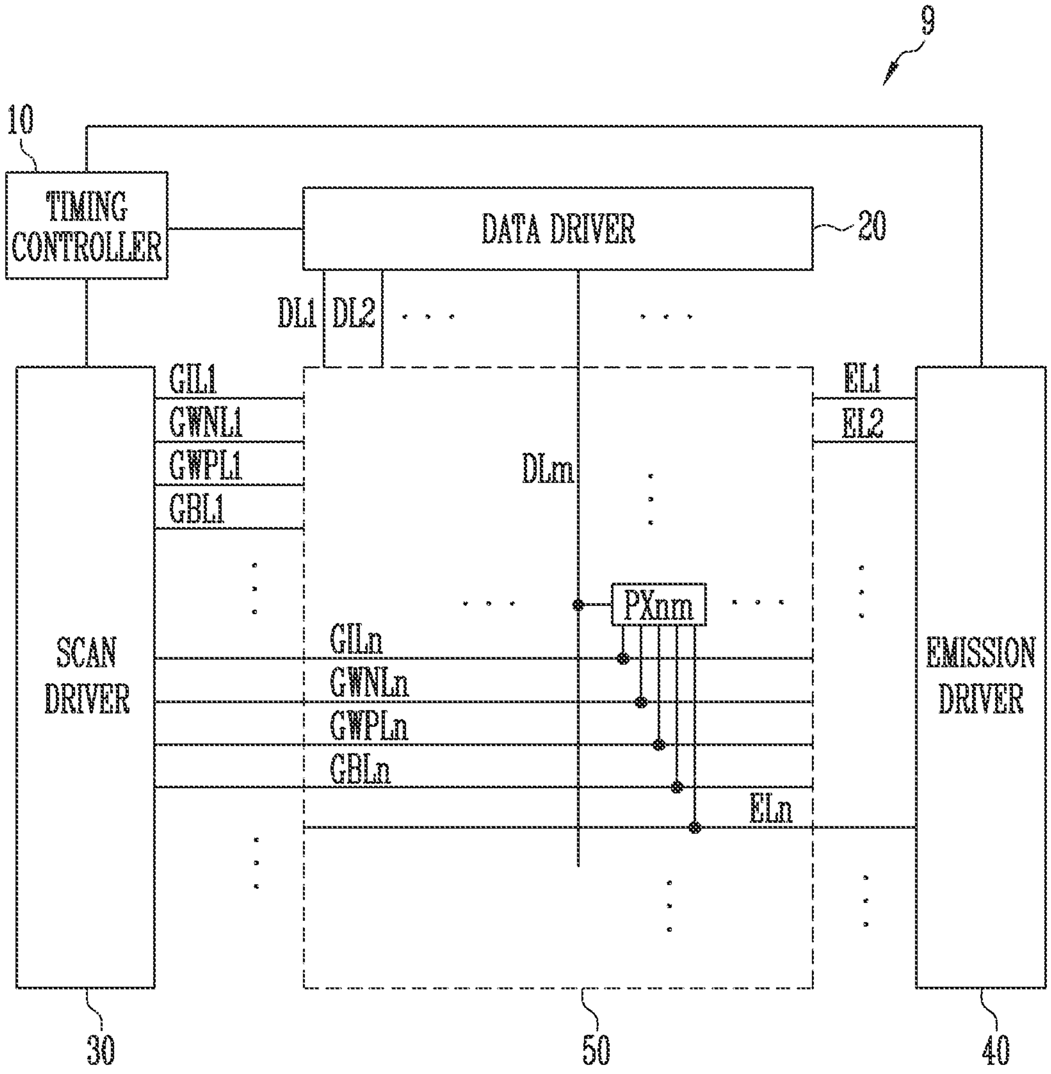
FIG. 1 is a diagram illustrating a display device in accordance with an embodiment of the present disclosure.

Hereinafter, example embodiments are described in more detail with reference to the accompanying drawings so that those skilled in the art may practice the present disclosure. The present disclosure may be implemented in various suitable and different forms and is not limited to the example embodiments described in the present specification. As used herein, the use of the term "may," when describing embodiments of the present disclosure, refers to "one or more embodiments of the present disclosure."

As used herein, the term "substantially," "about," "approximately," and similar terms are used as terms of approximation and not as terms of degree, and are intended to account for the inherent deviations in measured or calculated values that would be recognized by those of ordinary skill in the art. It will be understood that when an element or layer is referred to as being "on", "connected to", "coupled to", or "adjacent to" another element or layer, it can be directly on, connected to, coupled to, or adjacent to the other element or layer, or one or more intervening element(s) or layer(s) may be present.

A part irrelevant to the description (e.g., elements and/or processes that may be involved in the practice of the present disclosure, but which are not relevant to the present disclosure) may be omitted to clearly describe the present disclosure, and the same or similar constituent elements will be designated by the same reference numerals throughout the specification. Therefore, the same reference numerals may be used in different drawings to identify the same or similar elements. As used herein, the term "and/or" includes any and all combinations of one or more of the associated listed items.

In addition, the size and thickness of each component illustrated in the drawings may be exaggerated for better understanding and ease of description, and the present disclosure is not limited thereto. Thicknesses of some portions and regions may be exaggerated for clear expressions or description.

FIG. 1 is a diagram illustrating a display device in accordance with an embodiment of the present disclosure.

Referring to FIG. 1, the display device 9 may include a timing controller 10, a data driver 20, a scan driver 30, an emission driver 40, and a pixel unit 50.

The timing controller 10 may receive an external input signal from an external processor. The external input signal may include a vertical synchronization signal, a horizontal synchronization signal, a data enable signal, RGB data signals (e.g., red, green, and blue data signals), and the like.

The vertical synchronization signal may include a plurality of pulses. As used herein, a pulse may, for example, refer to a voltage pulse or a current pulse. When each pulse of the vertical synchronization signal is generated, this may indicate that a previous frame period is ended and a current frame period is started with respect to the time at which the pulse is generated. An interval between adjacent pulses of the vertical synchronization signal may correspond to one frame period. The horizontal synchronization signal may include a plurality of pulses. When each pulse of the horizontal synchronization signal is generated, this may indicate that a previous horizontal period is ended and a new horizontal period is started with respect to the time at which the pulse is generated. An interval between adjacent pulses of the horizontal synchronization signal may correspond to one horizontal period. The data enable signal may have an enable level in one or more horizontal periods (e.g., specific horizontal periods), and have a disable level in the other periods. When the data enable signal has the enable level, this may indicate that RGB data signals are supplied in the corresponding horizontal periods. The RGB data signals may be supplied in a unit of a pixel row in each of the corresponding horizontal periods. The timing controller 10 may generate grayscale values, based on the RGB data signals, to correspond to specifications of the display device 9. The timing controller 10 may generate control signals to be supplied to the data driver 20, the scan driver 30, the emission driver 40, and the like to correspond to the specifications of the display device 9.

The data driver 20 may generate data voltages to be provided to data lines DL1, DL2, . . . , and DLm by utilizing the grayscale values and control signals, which are received from the timing controller 10. For example, the data driver 20 may sample grayscale values by utilizing a clock signal, and supply data voltages corresponding to the grayscale values to the data lines DL1, DL2, . . . , and DLm in a unit of a pixel row (e.g., pixels connected to the same scan line). Here, m may be an integer greater than 0.

The scan driver 30 may generate scan signals to be provided to scan lines GIL1, GWNL1, GWPL1, GBL1, . . . , GILn, GWNLn, GWPLn, and GBLn by receiving a clock signal, a scan start signal, and the like from the timing controller 10. Here, n may be an integer greater than 0.

The scan driver 30 may include a plurality of sub-scan drivers. In an example, a first sub-scan driver may provide scan signals of the scan lines GIL1, . . . , and GILn, a second sub-scan driver may provide scan signals of the scan lines GWNL1, . . . , and GWNLn, a third sub-scan driver may provide scan signals of the scan lines GWPL1, . . . , and GWPLn, and a fourth sub-scan driver may provide scan signals for the scan lines GBL1, . . . , and GBLn. Each of the sub-scan drivers may include a plurality of scan stages connected in the form of shift registers. For example, the scan driver 30 may generate scan signals in a manner that sequentially transfers the scan start signal having a pulse of a turn-on level (e.g., of a turn-on magnitude), which is supplied to a scan start line, to a next scan stage.

In another example, the first and second sub-scan drivers may be integrated to provide scan signals of the scan lines GIL1, GWNL1, . . . , GILn, and GWNLn, and the third and fourth sub-scan drivers may be integrated to provide scan signals of the scan lines GWPL1, GBL1, . . . , GWPLn, and GBLn. For example, a previous scan line (e.g., an (n−1)th scan line) of an nth scan line GWNLn may be connected to the same electrical node as an nth scan line GILn. Also, for example, a next scan line (e.g., an (n+1)th scan line) of an nth scan line GWPLn may be connected to the same electrical node as an nth scan line GBLn.

The first and second sub-scan drivers may supply scan signals having pulses of a first polarity to the scan lines GIL1, GWNL1, . . . , GILn, and GWNLn. In addition, the third and fourth sub-scan drivers may supply scan signals having pulses of a second polarity to the scan lines GWPL1, GBL1, . . . , GWPLn, and GBLn. The first polarity and the second polarity may be polarities opposite to each other.

Hereinafter, a polarity may mean a logic level of a pulse. For example, when the pulse has the first polarity, the pulse may have a high level. The pulse having the high level may be referred to as a rising pulse. When the rising pulse is supplied to a gate electrode of an N-type (e.g., N-based) transistor, the N-type transistor may be turned on. For example, the rising pulse may have a turn-on level with respect to the N-type transistor. A case where a voltage having a level sufficiently lower than that of the gate electrode (e.g., than a voltage applied to the gate electrode) of the N-type transistor is applied to a source electrode of the N-type transistor is assumed. For example, the N-type transistor may be an NMOS transistor.

In addition, when the pulse has the second polarity, the pulse may have a low level. The pulse having the low level may be referred to as a falling pulse. When the falling pulse is supplied to a gate electrode of a P-type (e.g., P-based) transistor, the P-type transistor may be turned on. For example, the falling pulse may be a turn-on level with respect to the P-type transistor. A case where a voltage having a level sufficiently higher than that of the gate electrode (e.g., than a voltage applied to the gate electrode) of the P-type transistor is applied to a source electrode of the P-type transistor is assumed. For example, the P-type transistor may be a PMOS transistor.

The emission driver 40 may generate emission signals to be provided to emission lines EL1, EL2, . . . , and ELn by receiving a clock signal, an emission stop signal, and the like from the timing controller 10. For example, the emission driver 40 may sequentially provide the emission signals having a pulse of a turn-off level (e.g., of a turn-off magnitude) to the emission lines EL1, EL2, . . . , and ELn. For example, the emission driver 40 may be configured in the form of a shift register, and generate the emission signals in a manner that sequentially transfers the emission stop signal having a pulse of a turn-off level to a next emission stage under the control of the clock signal.

The pixel unit 50 includes pixels. For example, a pixel PXnm may be connected to a corresponding data line DLm, corresponding scan lines GILn, GWNLn, GWPLn, and GBLn, and a corresponding emission line ELn.

Figure 2:
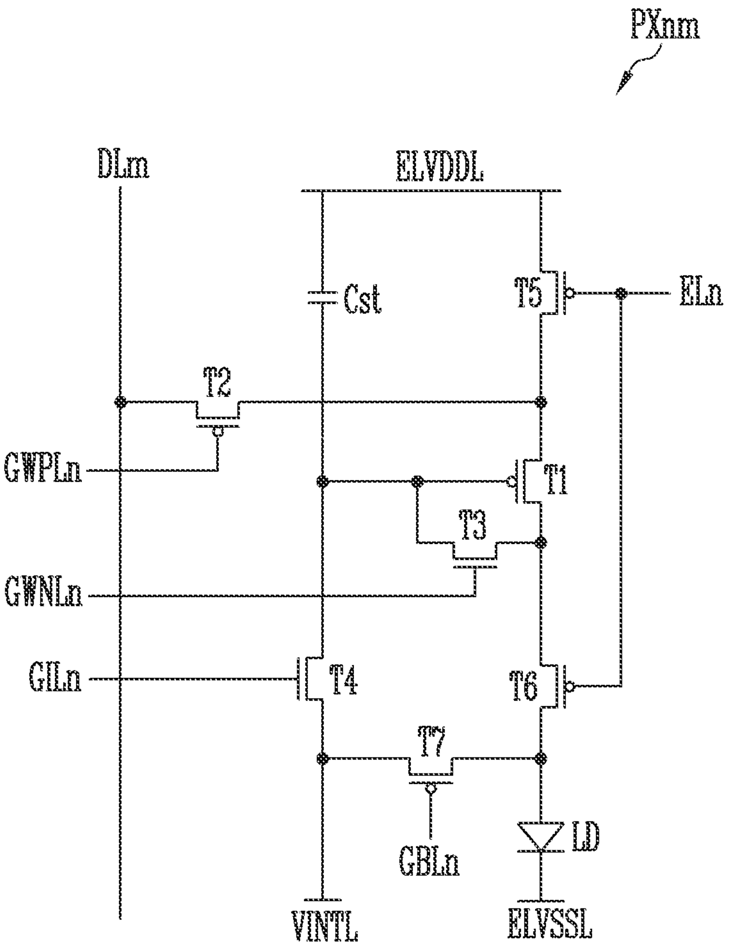
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, the pixel PXnm in accordance with the embodiment of the present disclosure may include transistors T1, T2, T3, T4, T5, T6, and T7, a storage capacitor Cst, and a light emitting diode LD.

A first electrode of the transistor T1 may be connected to a first electrode of the transistor T2, a second electrode of the transistor T1 may be connected to a first electrode of the transistor T3, and a gate electrode of the transistor T1 may be connected to a second electrode of the transistor T3. The transistor T1 may be referred to as a driving transistor.

The first electrode of the transistor T2 may be connected to the first electrode of the transistor T1, a second electrode of the transistor T2 may be connected to a data line DLm, and a gate electrode of the transistor T2 may be connected to a scan line GWPLn. The transistor T2 may be referred to as a scan transistor.

The first electrode of the transistor T3 may be connected to the second electrode of the transistor T1, the second electrode of the transistor T3 may be connected to the gate electrode of the transistor T1, and a gate electrode of the transistor T3 may be connected to a scan line GWNLn. The transistor T3 may be referred to as a diode connection transistor.

A first electrode of the transistor T4 may be connected to a second electrode of the storage capacitor Cst, a second electrode of the transistor T4 may be connected to an initialization line VINTL, and a gate electrode of the transistor T4 may be connected to a scan line GILn. The transistor T4 may be referred to as a gate initialization transistor.

A first electrode of the transistor T5 may be connected to a power line ELVDDL, a second electrode of the transistor T5 may be connected to the first electrode of the transistor T1, and a gate electrode of the transistor T5 may be connected to an emission line ELn. The transistor T5 may be referred to as a first emission transistor.

A first electrode of the transistor T6 may be connected to the second electrode of the transistor T1, a second electrode of the transistor T6 may be connected to an anode of the light emitting diode LD, and a gate electrode of the transistor T6 may be connected to the emission line ELn. The transistor T6 may be referred to as a second emission transistor.

A first electrode of the transistor T7 may be connected to the anode of the light emitting diode LD, a second electrode of the transistor T7 may be connected to the initialization line VINTL, and a gate electrode of the transistor T7 may be connected to a scan line GBLn. The transistor T7 may be referred to as an anode initialization transistor.

A first electrode of the storage capacitor Cst may be connected to the power line ELVDDL, and the second electrode of the storage capacitor Cst may be connected to the gate electrode of the transistor T1.

The anode of the light emitting diode LD may be connected to the second electrode of the transistor T6, and a cathode of the light emitting diode LD may be connected to a power line ELVSSL. A voltage applied to the power line ELVSSL may be set lower than that applied to the power line ELVDDL. The light emitting diode LD may be an organic light emitting diode, an inorganic light emitting diode, a quantum dot light emitting diode, or the like.

The transistors T1, T2, T5, T6, and T7 may be implemented with (e.g., may be) a P-type (e.g., P-based) transistor. Channels of the transistors T1, T2, T5, T6, and T7 may be configured with (e.g., may include or may be) poly-silicon. The poly-silicon transistor may be a Low Temperature Poly-Silicon (LTPS) transistor. The poly-silicon transistor has high electron mobility, and has a fast driving characteristic according to the high electron mobility.

The transistors T3 and T4 may be implemented with (e.g., may be) an N-type (e.g., N-based) transistor. Channels of the transistors T3 and T4 may be configured with (e.g., may include or be) an oxide semiconductor. The oxide semiconductor transistor can be formed through a low temperature process, and has a charge mobility lower than that of the poly-silicon transistor. Thus, the oxide semiconductor transistors have an amount of current leakage generated in a turn-off state, which is smaller than that of the poly-silicon transistors.

In some embodiments, the transistor T7 may be configured with an N-type (e.g., N-based) oxide semiconductor transistor instead of the poly-silicon transistor. In substitute for the scan line GBLn, one of the scan lines GWNLn and GILn may be connected to the gate electrode of the transistor T7.

Figure 3:
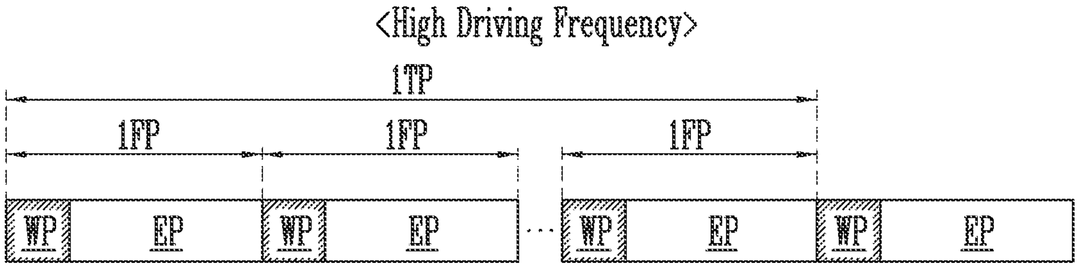
FIG. 3 is a diagram illustrating a high frequency driving method in accordance with an embodiment of the present disclosure.

FIG. 3 is a diagram illustrating a high frequency driving method in accordance with an embodiment of the present disclosure.

When the pixel unit 50 displays frames at a first driving frequency, the display device 9 may be said to be in a first display mode. Also, when the pixel unit 50 displays frames at a second driving frequency lower than the first driving frequency, the display device 9 may be said to be in a second display mode.

In the first display mode, the display device 9 may display image frames at a rate of 20 Hz or higher, e.g., 60 Hz.

The second display mode may be a low power display mode. In the second display mode, the display device 9 may display image frames at less than a rate of 20 Hz, e.g., 1 Hz. For example, a case where only time and date are displayed in an “always on mode” during a common use mode may correspond to the second display mode.

A period 1TP may include a plurality of frame periods 1FP. The period 1TP is a period which is arbitrarily defined so as to compare the first display mode and the second display mode. The period 1TP may mean the same time interval in the first display mode and the second display mode. For convenience of description, a case where a frame period 1FP has the same time interval in the first display mode and the second display mode is assumed. Therefore, the period 1TP in the first display mode and the second display mode may include the same number of frame periods 1FP.

In the first display mode, each frame period 1FP may include a data write period WP and an emission period EP. For convenience of description, a case where, based on a first pixel row, the data write period WP is located at an initial stage of the frame period 1FP and the emission period EP is located next to the data write period WP is illustrated in FIG. 3. However, in the case of a pixel row which is not the first pixel row, the data write period WP may be located at an intermediated or late stage of the frame period 1FP.

Therefore, the pixel PXnm may display a plurality of image frames corresponding to a number of frame periods 1FP during the period 1TP, based on data voltages received in data write periods WP.

Figure 4:
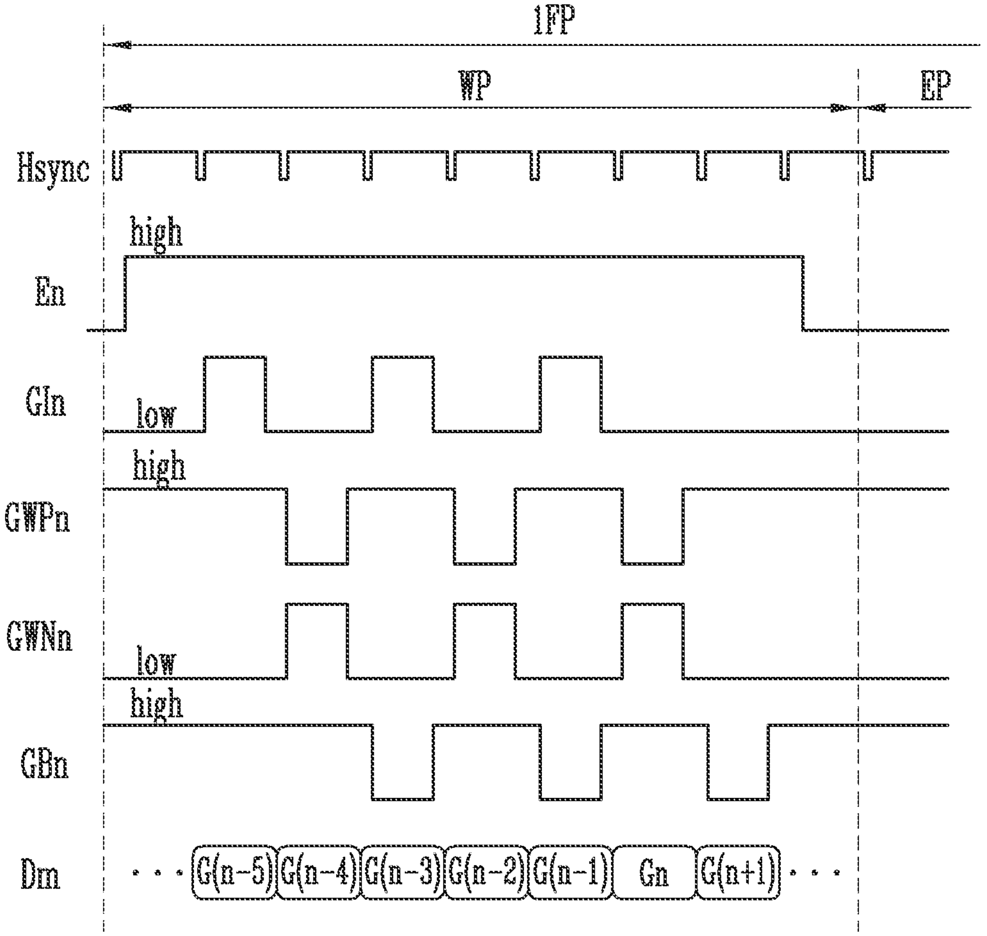
FIG. 4 is a diagram illustrating a data write period in accordance with an embodiment of the present disclosure.
Figure 5:
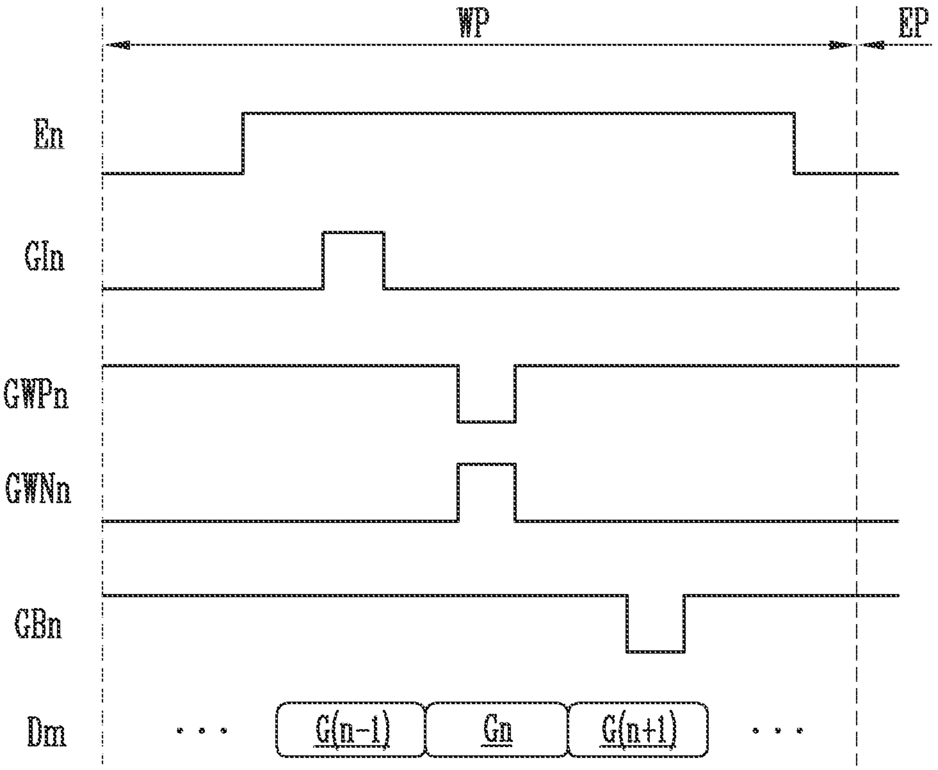
FIG. 5 is a diagram illustrating a data write period in accordance with another embodiment of the present disclosure.

FIG. 4 is a diagram illustrating a data write period in accordance with an embodiment of the present disclosure. FIG. 5 is a diagram illustrating a data write period in accordance with another embodiment of the present disclosure.

First, an emission signal En having a turn-off level (high level) may be supplied to the emission line ELn during the data write period WP. Therefore, the transistors T5 and T6 may be in a turn-off state during the data write period WP.

First, a first pulse (e.g., first pulse of a scan signal Gln) of a turn-on level (high level) is supplied to the scan line GILn. In some embodiments, the first pulse of the scan signal Gln may begin to be supplied to the scan line GILn after the emission signal En begins to be supplied to the emission line ELn. Accordingly, the transistor T4 is turned on, and the gate electrode of the transistor T1 and the initialization line VINTL are connected to each other. Accordingly, a voltage of the gate electrode of the transistor T1 is initialized to an initialization voltage of the initialization line VINTL, and is maintained by the storage capacitor Cst. For example, the initialization voltage of the initialization line VINTL may be a voltage sufficiently lower than a voltage of the power line ELVDDL. For example, the initialization voltage may be a voltage having a level equal or similar to that of the voltage of the power line ELVSSL. Therefore, the transistor T1 may be turned on.

Next, first pulses (e.g., a first pulse of each of scan signals GWPn and GWNn) of a turn-on level (e.g., low level for the first pulse of scan signal GWPn and high level for the first pulse of the scan signal GWNn) are supplied to the scan lines GWPLn and GWNLn, and the corresponding transistors T2 and T3 are turned on. Accordingly, a data voltage Dm applied to the data line DLm is written in (e.g., applied to, or stored in) the storage capacitor Cst through the transistors T2, T1, and T3. However, the data voltage Dm corresponds to a grayscale value G(n−4) of the pixel before four horizontal periods (e.g., four horizontal periods earlier). The data voltage Dm is not utilized for emission of the pixel PXnm but is utilized to apply an on-bias voltage to the transistor T1. When the on-bias voltage is applied before a set data voltage Dm is written to the transistor T1, a hysteresis phenomenon can be minimized or reduced.

Next, a first pulse (e.g., a first pulse of a scan signal GBn) having a turn-on level (low level) is supplied to the scan line GBLn, and the transistor T7 is turned on. Therefore, an anode voltage of the light emitting diode LD is initialized.

A second pulse (e.g., a second pulse of the scan signal Gln) having a turn-on level (high level) is supplied to the scan line GILn, and the above-described driving process is again performed. For example, the on-bias voltage is again applied to the transistor T1, and the anode voltage of the light emitting diode LD is initialized.

By repeating the above-described process, when third pulses having a turn-on level are supplied to the scan lines GWPLn and GWNLn, a data voltage Dm corresponding to a grayscale value Gn of the pixel PXnm is written in the storage capacitor Cst. The data voltage Dm written in the storage capacitor Cst is a voltage obtained by reflecting a decrement (e.g., reduction) of a threshold voltage of the transistor T1.

Finally, when the emission signal En becomes a turn-on level (low level), the transistors T5 and T6 are in (e.g., return to) a turn-on state. Accordingly, a driving current path is formed, through which the power line ELVDDL, the transistors T5, T1, and T6, the light emitting diode LD, and the power line ELVSSL are connected, and a driving current flows through the driving current path. An amount of driving current corresponds to the data voltage Dm stored in the storage capacitor Cst. Because the driving current flows through the transistor T1, a decrement of the threshold voltage of the transistor T1 is reflected. Accordingly, the decrement of the threshold voltage, which is reflected to the data voltage Dm stored in the storage capacitor Cst, and the decrement of the threshold voltage, which is reflected to the driving current, are cancelled with each other, and thus a driving current corresponding to the data voltage Dm can flow regardless of the threshold voltage of the transistor T1.

The light emitting diode LD emits light with a set luminance according to the amount of driving current.

In this embodiment, a case where each scan signal (e.g., Gln, GWPn, GWNn, and GBn) includes three pulses is described. However, in another embodiment, each scan signal may include two or four or more pulses. In still another embodiment, each scan signal may include one pulse, and therefore, the process of applying the on-bias voltage to the transistor T1 is omitted (see FIG. 5). Hereinafter, for convenience of description, the data write period WP will be described based on FIG. 5.

In addition, an interval between adjacent pulses of the horizontal synchronization signal Hsync may correspond to one horizontal period. For example, one horizontal period may correspond to the time difference between the beginning of one pulse of the horizontal synchronization signal and the beginning of an adjacent pulse of the horizontal synchronization signal. Although a case where a pulse of the horizontal synchronization signal Hsync has a low level is illustrated in FIG. 4, the pulse of the horizontal synchronization signal Hsync may have a high level in another embodiment.

Figure 6:
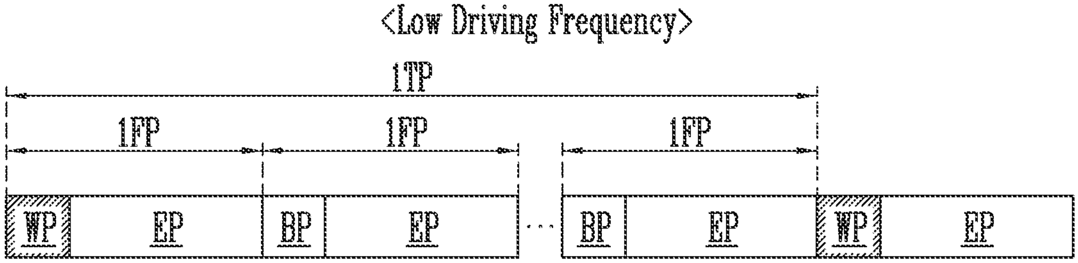
FIG. 6 is a diagram illustrating a low frequency driving method in accordance with an embodiment of the present disclosure.

FIG. 6 is a diagram illustrating a low frequency driving method in accordance with an embodiment of the present disclosure.

In the second display mode, a first frame period 1FP during a period 1TP may include a data write period WP and an emission period EP, and each of the other frame periods 1FP during the period 1TP may include a bias refresh period BP and an emission period EP.

The transistors T3 and T4 of the pixel PXnm maintain the turn-off state in the other frame periods 1FP during the period TP (e.g., the frame periods 1FP during the period TP after the first frame period 1FP), and therefore, the storage capacitor Cst maintains the same data voltage during a plurality of image frames. For example, the transistors T3 and T4 are configured as oxide semiconductor transistors, and thus current leakage can be minimized or reduced.

Thus, the pixel PXnm can display the same single image frame during the period TP, based on a data voltage supplied during the data write period WP.

Figure 7:
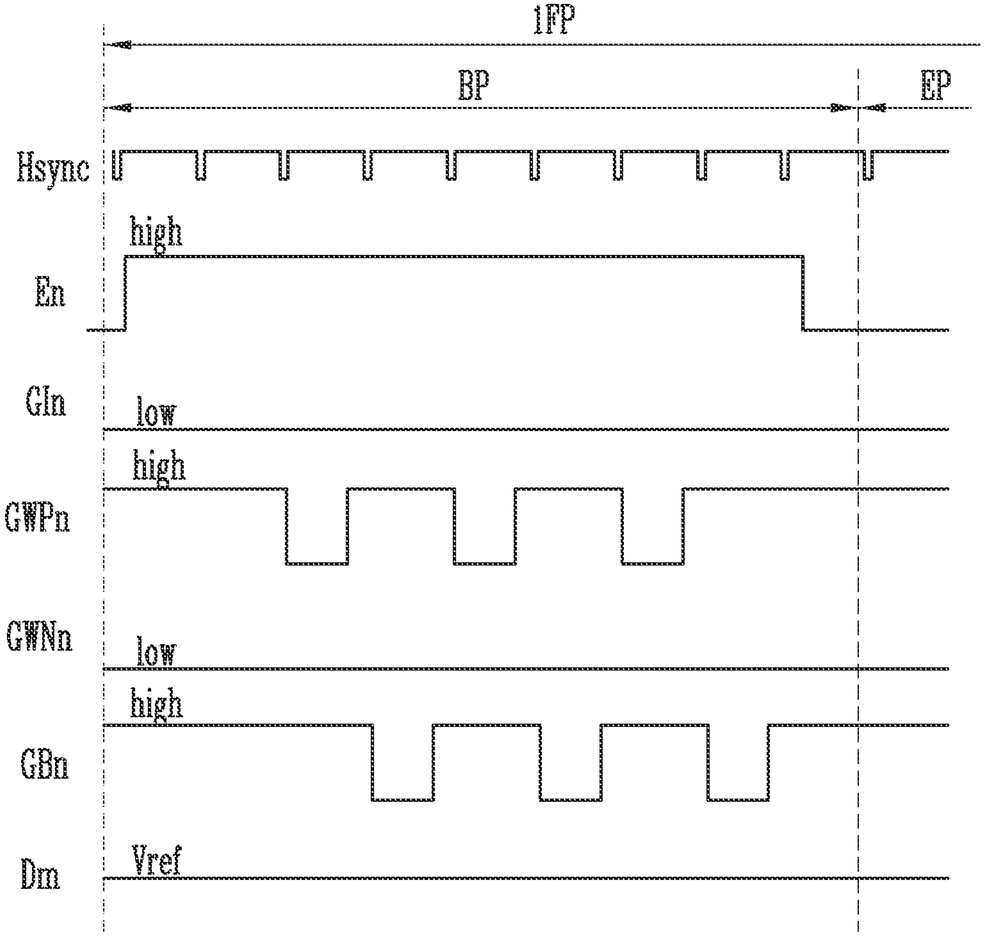
FIG. 7 is a diagram illustrating a bias refresh period in accordance with an embodiment of the present disclosure.
Figure 8:
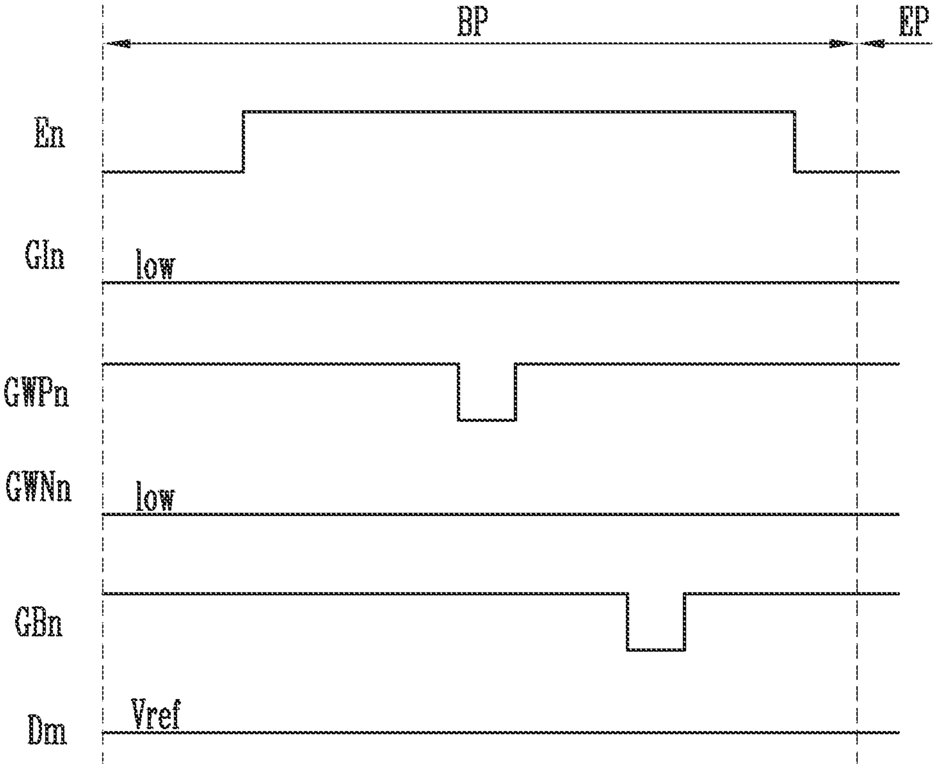
FIG. 8 is a diagram illustrating a bias refresh period in accordance with another embodiment of the present disclosure.

FIG. 7 is a diagram illustrating a bias refresh period in accordance with an embodiment of the present disclosure. FIG. 8 is a diagram illustrating a bias refresh period in accordance with another embodiment of the present disclosure.

Referring to FIG. 7, in the bias refresh period BP, scan signals Gln and GWNn having a turn-off (low level) are supplied. Therefore, as described above, a data voltage written in the storage capacitor Cst is not changed in the bias refresh period BP. A reference data voltage Vref may be applied to the data line DLm.

However, in the bias refresh period BP, an emission signal En and scan signals GWPn and GBn, which have the same wavelengths as those in the data write period WP, may be supplied. Thus, in a plurality of frame periods 1FP of the period 1TP, lights emitted from the light emitting diode LD have similar wavelengths, so that little or no flicker is viewed by a user in low frequency driving.

The pixel PXnm described with reference to FIGS. 1 to 7 is an embodiment suitable for high frequency driving and low frequency driving. Embodiments which will be described later may be applied even to a pixel having another circuit, on which high frequency driving and low frequency driving can be performed. For example, the transistors T1 to T7 of the pixel PXnm may all be configured as only P-type (e.g., P-based) transistors. Thus, the scan driver 30 includes only a sub-scan driver of the P-type transistors, and accordingly, the configuration of the scan driver 30 can be simplified. For example, the transistors of the pixel PXnm may not include the emission transistors T5 and T6. Therefore, the emission driver 40 may be unnecessary.

In this embodiment, a case where each of the scan signals GWPn and GBn includes three pulses is described. However, in another embodiment, each of the scan signals GWPn and GBn may include two or four or more pulses. In still another embodiment, each of the scan signals GWPn and GBn may include one pulse, and therefore, the process of applying the on-bias voltage to the transistor T1 is omitted (see FIG. 8). Hereinafter, for convenience of description, the bias refresh period BP will be described based on FIG. 8.

Figure 9:
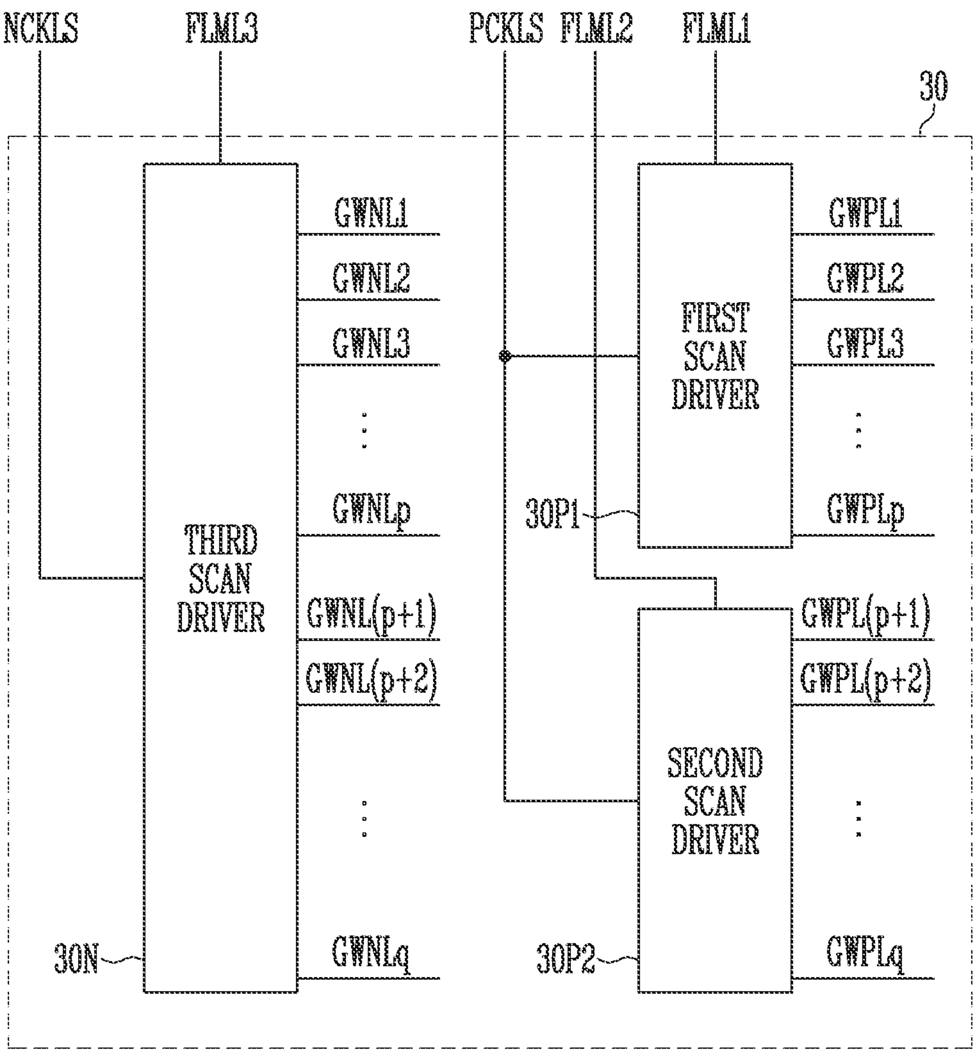
FIG. 9 is a diagram illustrating a scan driver in accordance with an embodiment of the present disclosure.

FIG. 9 is a diagram illustrating a scan driver in accordance with an embodiment of the present disclosure.

Referring to FIG. 9, the scan driver 30 in accordance with the embodiment of the present disclosure may include a first scan driver 30P1, a second scan driver 30P2, and a third scan driver 30N.

As described with reference to FIG. 1, in some embodiments, scan signals of the scan lines GIL to GILn may be provided to (e.g., may be provided by) the third scan driver 30N. In another embodiment, the scan signals of the scan lines GIL1 to GILn may be provided from a separate scan driver. In addition, in some embodiments, scan signals of the scan lines GBL1 to GBLn may be provided to (e.g., may be provided by) the first and second scan drivers 30P1 and 30P2. In another embodiment, the scan signals of the scan lines GBL1 to GBLn may be provided to a separate scan driver.

The first scan driver 30P1 may be connected to a first scan start line FLML1, scan clock lines PCKLS, and scan lines GWPL1, GWPL2, GWPL3, . . . , and GWPLp. Here, p may be an integer greater than 0. At least one of scan clock signals supplied to the first scan driver 30P through the scan clock lines PCKLS may be defined as a first scan clock signal.

The second scan driver 30P2 may be connected to a second scan start line FLML2, scan clock lines PCKLS, and scan lines GWPL(p+1), GWPL(p+2), . . . , and GWPLq. Here, q may be an integer greater than p. At least one of scan cock signals supplied to the second scan driver 30P2 through the scan clock lines PCKLS may be defined as a second scan clock signal. The second scan driver 30P2 may be connected to the same scan clock lines PCKLS as the first scan driver 30P1. For example, the first scan clock signal and the second scan clock signal may be the same. However, embodiments are not limited thereto, and in some embodiments the second scan driver 30P2 may be connected to the second scan start line FLML2 independent from the first scan start line FLML1 of the first scan driver 30P1. For example, the second scan driver 30P2 may be connected to a different scan clock line than the first scan driver 30P1, and the first scan clock signal and the second scan clock signal may be different. A first scan line GWPL(p+1) of the second scan driver 30P2 may correspond to a next scan line of the last scan line GWPLp of the first scan driver 30P1.

The third scan driver 30N may be connected to a third scan start line FLML3, scan clock lines NCKLS, and scan lines (GWNL1, GWNL2, GWNL3, . . . , GWNLp, GWNL(p+1), GWNL(p+2), . . . , and GWNLq.

Figure 10:
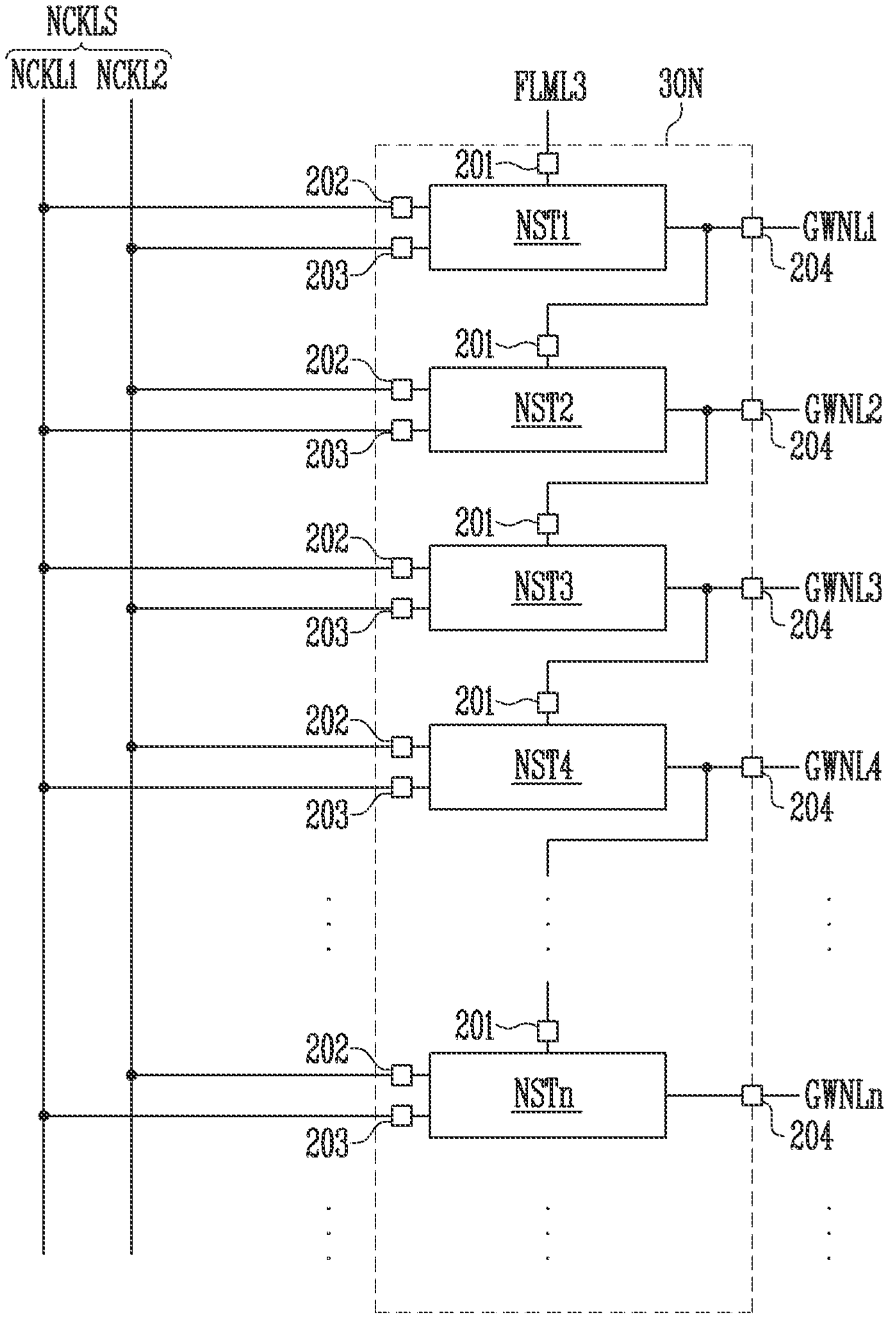
FIG. 10 is a diagram illustrating a third scan driver in accordance with an embodiment of the present disclosure.

FIG. 10 is a diagram illustrating a third scan driver in accordance with an embodiment of the present disclosure.

The third scan driver 30N shown in FIG. 10 may correspond to the second sub-scan driver described with reference to FIG. 1. Those skilled in the art may implement the first sub-scan driver described with reference FIG. 1, by replacing scan lines GWNL1, GWNL2, GWNL3, GWNL4, . . . , and GWNLn shown in FIG. 10 with the scan lines GIL1 to GILn. For example, in some embodiments, the first sub-scan driver described with reference to FIG. 1 may have the same structure or configuration as the third scan driver 30N described with reference to FIG. 10, except that the scan lines GWNL1 to GWNLn are replaced with the scan lines GIL1 to GILn.

Referring to FIG. 10, the third scan driver 30N may include scan stages NST1, NST2, NST3, NST4, . . . , NSTn. Each of the scan stages NST1 to NSTn may be connected to a previous stage scan line (or carry line) through a first input terminal 201. However, because a first scan stage NST1 has no previous stage scan line to which the first scan stage NST1 is connected, and the first scan stage NST1 may be connected to the third scan start line FLML3 through the input terminal 201.

Each of odd-numbered scan stages NST1, NST3, . . . may include a second input terminal 202 to which a clock line NCKL1 is connected and a third input terminal 203 to which a clock line NCKL2 is connected. Each of even-numbered scan stages NST2, NST4, . . . , NSTn may include a second input terminal 202 to which the clock line NCKL2 is connected and a third input terminal 203 to which the clock line NCKL1 may be connected.

In some embodiments, each of odd-numbered scan stages NST1, NST3, . . . may include the second input terminal 202 to which the clock line NCKL2 is connected and the third input terminal 203 to which the clock line NCKL1 is connected. Each of even-numbered scan stages NST2, NST4, . . . , NSTn may include the second input terminal 202 to which the clock line NCKL1 is connected and the third input terminal 203 to which the clock line NCLK2 is connected.

The scan stages NST1 to NSTn may be connected to corresponding scan lines GWNL1 to GWNLn through output terminals 204, respectively.

The scan stages NST1 to NSTn may be connected to each other in the form of shift registers. For example, each of the scan stages NST1 to NSTn may generate scan signals in a manner that sequentially transfers a third scan start signal having a pulse of a turn-on level, which is supplied to the third scan start line FLML3, to a next scan stage.

Figure 11:
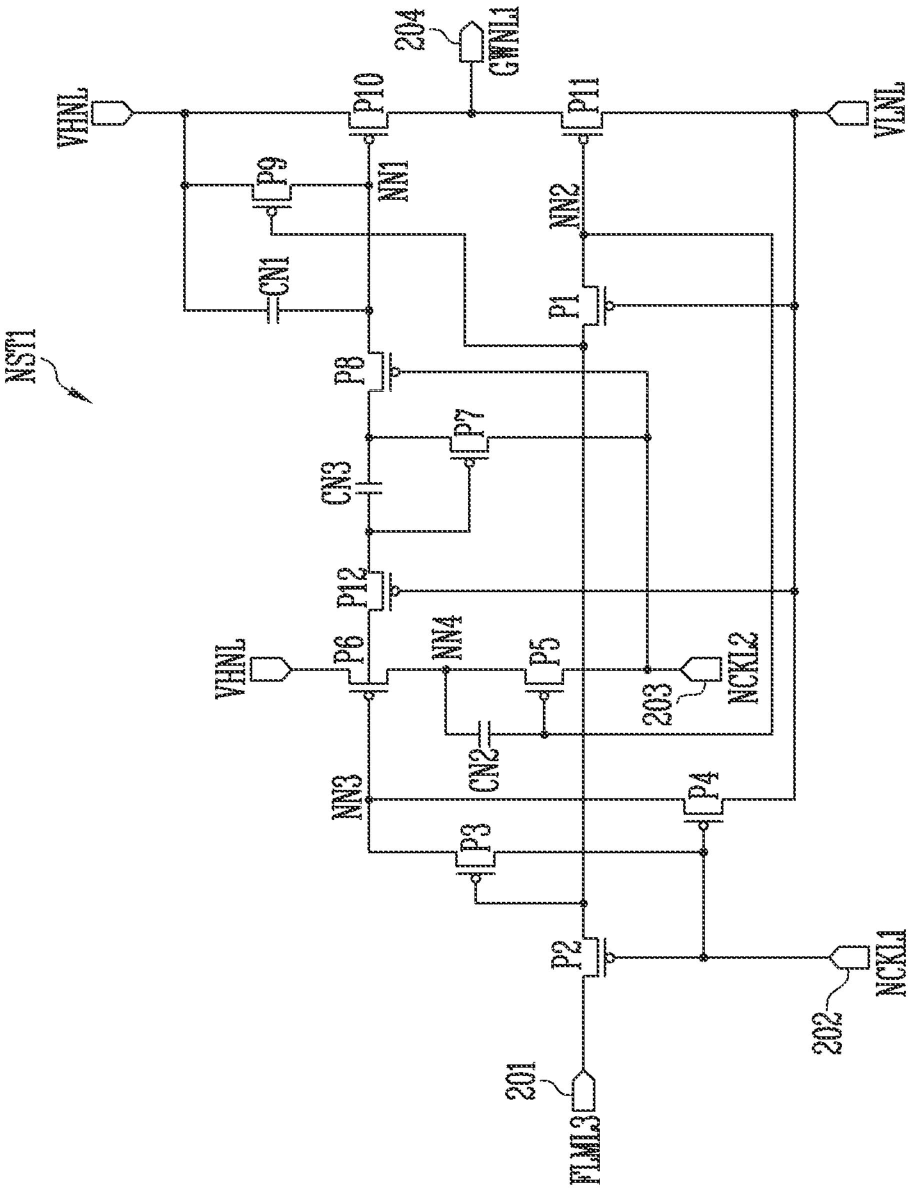
FIG. 11 is a diagram illustrating a scan stage of the third scan driver shown in FIG. 10.

FIG. 11 is a diagram illustrating the scan stage of the third scan driver shown in FIG. 10.

Referring to FIG. 11, the first scan stage NST1 of the scan driver N30 shown in FIG. 10 is illustrated as an example embodiment. The other scan stages NST2, NST3, NST4, . . . , and NSTn shown in FIG. 10 have the substantially same configuration as the scan stage NST1, and therefore, overlapping descriptions may not be repeated.

The scan stage NST1 may include transistors P1 to P12 and capacitors CN1 to CN3. The transistors P1 to P12 may be P-type (e.g., P-based) transistors.

A first electrode of the transistor P2 may be connected to a second electrode of the transistor P1, a second electrode of the transistor P2 may be connected to the third scan start line FLML3, and a gate electrode of the transistor P2 may be connected to the clock line NCKL1.

A first electrode of the transistor P3 may be connected to a node NN3, a second electrode of the transistor P3 may be connected to the clock line NCKL1, and a gate electrode of the transistor P3 may be connected to the first electrode of the transistor P2.

In some embodiments, the transistor P3 may include a first sub-transistor and a second sub-transistor, which are connected in series. A first electrode of the first sub-transistor may be connected to the node NN3, a second electrode of the first sub-transistor may be connected to a first electrode of the second sub-transistor, and a gate electrode of the first sub-transistor may be connected to the first electrode of the transistor P2. The first electrode of the second sub-transistor may be connected to the second electrode of the first sub-transistor, a second electrode of the second sub-transistor may be connected to the clock line NCKL1, and a gate electrode of the second sub-transistor may be connected to the first electrode of the transistor P2. In accordance with this embodiment, a current leakage can be reduced, and an excessive source-drain voltage can be divided. Accordingly, stress applied to the transistor P3 can be decreased.

A first electrode of the transistor P4 may be connected to the node NN3, and a second electrode of the transistor P4 may be connected to a power line VLNL, and a gate electrode of the transistor P4 may be connected to the clock line NCKL1.

A first electrode of the transistor P5 may be connected to a node NN4, a second electrode of the transistor P5 may be connected to the clock line NCKL2, and a gate electrode of the transistor P5 may be connected to a node NN2.

A first electrode of the transistor P6 may be connected to a power line VHNL, a second electrode of the transistor P6 may be connected to the node NN4, and a gate electrode of the transistor P6 may be connected to the node NN3.

A first electrode of the transistor P7 may be connected to a first electrode of the capacitor CN3, a second electrode of the transistor P7 may be connected to the clock line NCKL2, and a gate electrode of the transistor P7 may be connected to a second electrode of the capacitor CN3.

A first electrode of the transistor P8 may be connected to a node NN1, a second electrode of the transistor P8 may be connected to the first electrode of the capacitor CN3, and a gate electrode of the transistor P8 may be connected to the clock line NCKL2.

A first electrode of the transistor P9 may be connected to the power line VHNL, a second electrode of the transistor P9 may be connected to the node NN1, and a gate electrode of the transistor P9 may be connected to the node NN2 (e.g., through the transistor P1).

A first electrode of the transistor P10 may be connected to the power line VHNL, a second electrode of the transistor P10 may be connected to the scan line GWNL1, and a gate electrode of the transistor P10 may be connected to the node NN1.

A first electrode of the transistor P11 may be connected to the scan line GWNL1, a second electrode of the transistor P11 may be connected to the power line VLNL, and a gate electrode of the transistor P11 may be connected to the node NN2.

A first electrode of the transistor P12 may be connected to the second electrode of the capacitor CN3, a second electrode of the transistor P12 may be connected to the node NN3, and a gate electrode of the transistor P12 may be connected to the power line VLNL.

A first electrode of the transistor P1 may be connected to the node NN2, the second electrode of the transistor P1 may be connected to the first electrode of the transistor P2, and a gate electrode of the transistor P1 may be connected to the power line VLNL.

A first electrode of the capacitor CN1 may be connected to the power line VHNL, and a second electrode of the capacitor CN1 may be connected to the node NN1.

A first electrode of the capacitor CN2 may be connected to the node NN4, and a second electrode of the capacitor CN2 may be connected to the node NN2.

The first electrode of the capacitor CN3 may be connected to the first electrode of the transistor P7, and the second electrode of the capacitor CN3 may be connected to the gate electrode of the transistor P7.

Figure 12:
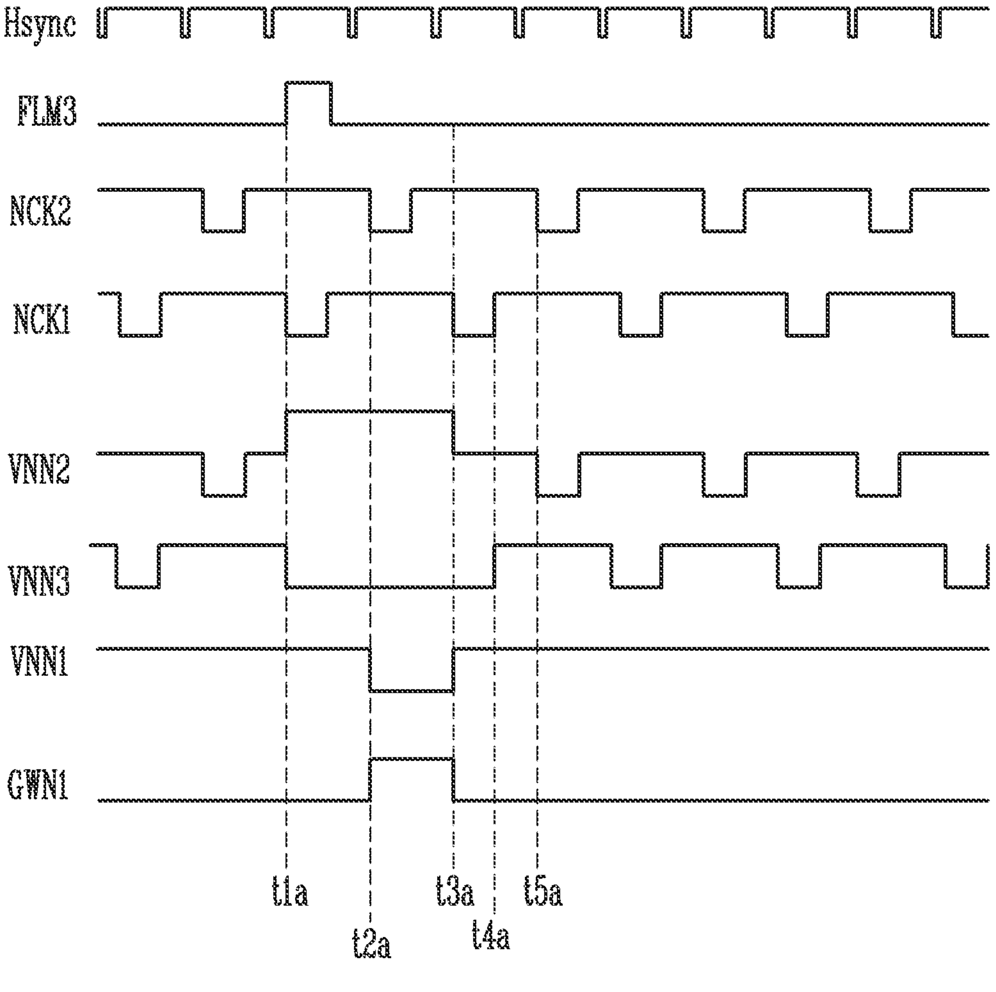
FIG. 12 is a diagram illustrating a driving method of the scan stage shown in FIG. 11.

FIG. 12 is a diagram illustrating a driving method of the scan stage shown in FIG. 11.

Referring to FIG. 12, there is illustrated a timing diagram of a third scan start signal FLM3 applied to the third scan start line FLML3, a clock signal NCK2 applied to the clock line NCKL2, a clock signal NCK1 applied to the clock line NCKL1, a node voltage VNN2 of the node NN2, a node voltage VNN3 of the node NN3, a node voltage VNN1 of the node NN1, and a scan signal GWN1 applied to the scan line GWNL1. The horizontal synchronization signal Hsync is illustrated as a reference signal for timing. An interval between pulses of the horizontal synchronization signal may be referred to as one horizontal period.

A voltage having a high level may be applied to the power line VHNL, and a voltage having a low level may be applied to the power line VLNL. For example, the voltage applied to the power line VHNL may be higher than the voltage applied to the power line VLNL. In the description of the driving method, the transistors P12 and P1 each have the gate electrode connected to the power line VLNL and are in a turn-on state during a majority of period (e.g., during a majority of the time), and therefore, descriptions of the transistors P12 and P1 may not be provided.

First, at a time ta, the third scan start signal FLM3 having a turn-off level (high level) is supplied, and the clock signal NCK1 having a low level is supplied. Therefore, the transistors P2 and P4 are turned on.

When the transistor P2 is turned on, the third scan start signal FLM3 having a high level is transferred to the node NN2, and the node voltage VNN2 has a high level. The transistors P3, P5, P9, and P11 are turned off by the node voltage VNN2 having the high level.

When the transistor P4 is turned on, the node NN3 and the power line VLNL are connected to each other, and therefore, the node voltage VNN3 has a low level. The transistors P6 and P7 are turned on by the node voltage VNN3 having the low level.

When the transistor P6 is turned on, the node NN4 and the power line VHNL are connected to each other. Therefore, the power line VHNL supports one end of the capacitor CN2 (e.g., the first electrode of the capacitor CN2), and hence the node voltage VNN2 of the node NN2 can be stably maintained.

When the transistor P7 is turned on, the first electrode of the capacitor CN3 and the clock line NCKL2 are connected to each other. Because the clock signal NCK2 having a high level is applied to the gate electrode of the transistor P8, the transistor P8 is in a turn-off state, and therefore, the node voltage VNN1 is not changed (e.g., the node voltage VNN1 has a high level).

At a time t2*a*, the clock signal NCK2 having a low level is supplied.

The clock signal NCK2 having the low level is supplied to the first electrode of the capacitor CN3 through the transistor P7. A voltage having a level lower than the low level is applied to the gate electrode of the transistor P7 due to coupling of the capacitor CN3. Thus, the transistor P7 can stably maintain the turn-on state and have an improved driving characteristic.

In accordance with this embodiment, the node voltage VNN3 is not influenced by the coupling of the capacitor CN3 due to the transistor P12. When a voltage having a level lower than the low level is applied to the first electrode of the transistor P12 due to the coupling of the capacitor CN3, the first electrode of the transistor P12 serves as a drain electrode. Therefore, the node NN3 corresponding to the second electrode of the transistor P12 serves as a source electrode (e.g., a source electrode of the transistor P12). In addition, because a voltage having a low level is applied to the gate electrode of the transistor P12 through the power line VLNL, a voltage having a level higher than the low level is to be applied to the source electrode of the transistor P12 such that the transistor P12 is turned on. At the current time, the node voltage VNN3 of the node NN3 has a low level, and therefore, the transistor P12 is in the turn-off state.

Thus, in accordance with this embodiment, the node voltage VNN3 is maintained by the transistor P12, and thus an excessive bias voltage is prevented or blocked from being applied to the transistors P3 and P4, so that the lifetime of the transistors P3 and P4 can be extended.

In addition, the transistor P8 is turned on by the clock signal NCK2 having a low level. Therefore, the node NN1 and the clock line NCKL2 are connected to each other through the transistors P7 and P8. Accordingly, the transistor P10 is turned on by the node voltage VNN1 having a low level. The transistor P9 maintains the turn-off state due to the node voltage VNN2 having a high level.

The power line VHNL and the scan line GWNL1 are connected to each other through the transistor P10 in the turn-on state. Therefore, a voltage having a high level as the scan signal GWN1 having a high level is supplied to the scan line GWNL1.

At a time t3*a*, the clock signal NCK1 having a low level is supplied. Therefore, the transistor P4 is turned on, and the node NN3 is connected to the power line VLNL. Hence, the node voltage VNN3 maintains the low level. In addition, the transistor P2 is turned on, and the third scan start signal FLM3 having a low level is supplied to the node NN2. Therefore, the transistors P3, P5, P9, and P11 are turned on. Accordingly, the transistor P10 is diode-connected, and hence a voltage having a high level, which is applied to the power line VHNL, is not transferred to the scan line GWNL1. A voltage having a low level, which is applied to the power line VLNL, is transferred to the scan line GWNL1 through the transistor P11 in the turn-on state.

At a time t4*a*, the clock signal NCK1 having a high level is supplied. Because the transistor P3 is in the turn-on state, the node voltage VNN3 is increased. Accordingly, the transistors P6 and P7 are turned off.

At a time t5*a*, the clock signal NCK2 having a low level is provided. Because the transistor P5 is in the turn-on state, the node voltage VNN2 is decreased to a level lower than the low level due to coupling of the capacitor CN2. Thus, the transistor P11 can stably maintain the turn-on state and have an improved driving characteristic.

In accordance with this embodiment, a node corresponding to the second electrode of the transistor P1 is not influenced by the coupling of the capacitor CN2 due to the transistor P1. When a voltage having a level lower than the low level is applied to the node NN2 as the first electrode of the transistor P1 due to the coupling of the capacitor CN2, the first electrode of the transistor P1 serves as a drain electrode. Therefore, a node corresponding to the second electrode of the transistor P1 serves as a source electrode. In addition, because a voltage having a low level is applied to the gate electrode of the transistor P1 through the power line VLNL, a voltage having a level higher than the low level is to be applied to the source electrode of the transistor P1 such that the transistor P1 is turned on. At the current time, the voltage having the low level is applied to the source electrode of the transistor P1, and hence the transistor P1 is in the turn-off state.

Thus, in accordance with this embodiment, the voltage of the node corresponding to the second electrode of the transistor P1 is maintained by the transistor P1, so that an excessive bias voltage is prevented or blocked from being applied to the transistors P2 and P3. Accordingly, the lifetime of the transistors P2 and P3 can be extended.

Figure 13:
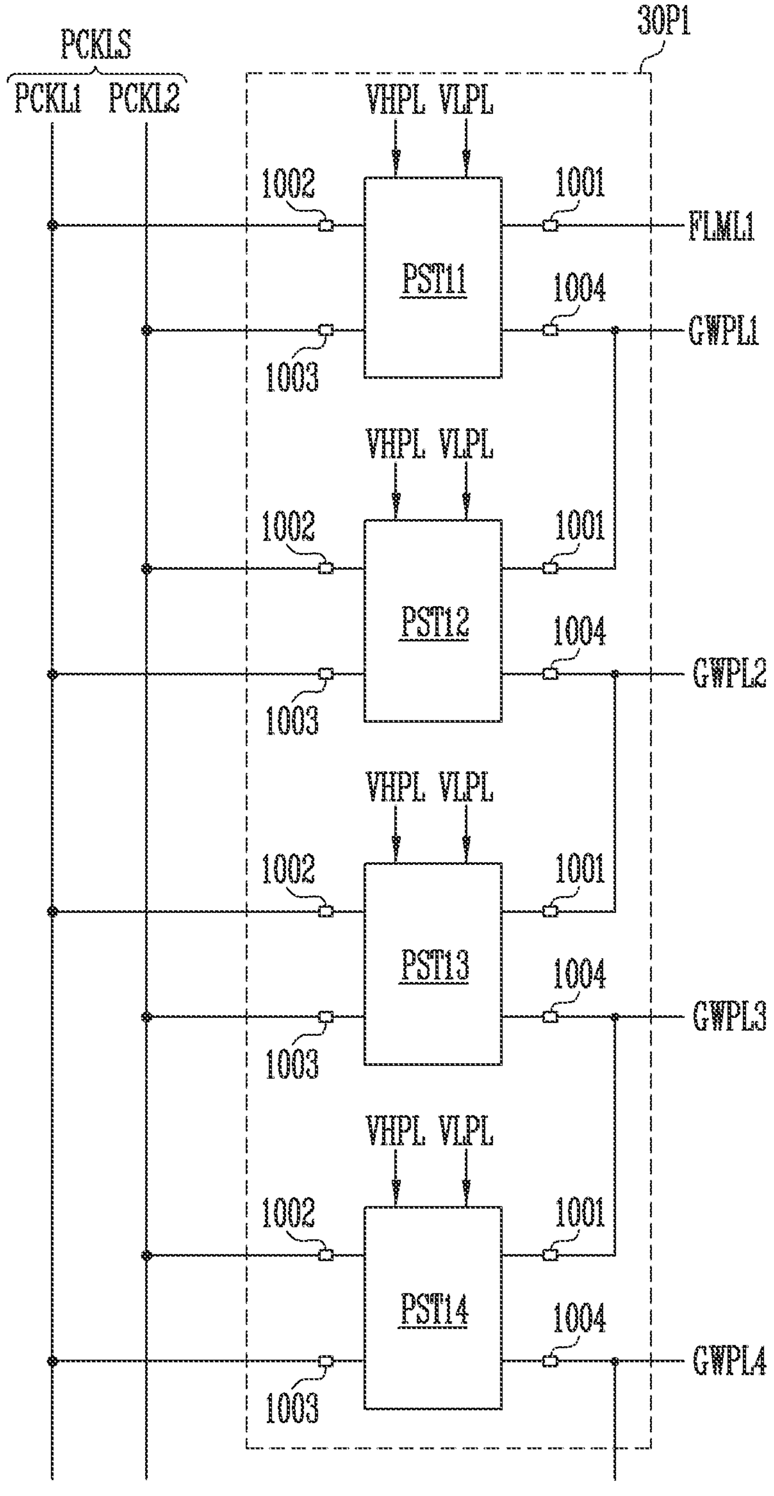
FIG. 13 is a diagram illustrating a first scan driver in accordance with an embodiment of the present disclosure.

FIG. 13 is a diagram illustrating a first scan driver in accordance with an embodiment of the present disclosure.

Referring to FIG. 13, the first scan driver 30P1 may include scan stages PST11 to PST14. The scan stages PST11 to PST14 may be connected to corresponding scan lines GWPL1 to GWPL4 and scan clock lines PCKLS. The scan stages PST11 to PST14 may be implemented with the same circuit.

Each of the scan stages PST11 to PST14 may include a first input terminal 1001, a second input terminal 1002, a third input terminal 1003, and an output terminal 1004.

The first input terminal 1001 of a first scan stage PST11 may be connected to the first scan start line FLML1. The first input terminal 1001 of each of the other scan stages PST12 to PST14 may be connected to a scan line (or carry line) of a previous scan stage. In an example, the first input terminal 1001 of the first scan stage PST11 is supplied with a first scan start signal, and the first input terminal 1001 of each of the other scan stages PST12 to PST14 is supplied with an output signal (e.g., scan signal or carry signal) of a previous scan stage.

The second input terminal 1002 of a jth (j is an odd or even number) scan stage may be connected to a clock line PCKL1, and the third input terminal 1003 of the jth scan stage may be connected to a clock line PCKL2. The second input terminal 1002 of a (j+1)th scan stage may be connected to the clock line PCKL2, and the third input terminal 1003 of the (j+1)th scan stage may be connected to the clock line PCKL1.

Pulses of clock signals PCK1 and PCK2 applied to the clock lines PCKL1 and PCKL2 have the same cycle (e.g., two horizontal periods) but have different phases. Therefore, the pulses of the clock signals PCK1 and PCK2 may not overlap with each other (see FIG. 15).

Also, each of the scan stages PST11 to PST14 may be connected to a power line VHPL and a power line VLPL. The voltage of the power line VHPL may be set to a turn-off level (gate-off voltage or voltage having high level). In addition, the voltage of the power line VLPL may be set to a turn-on level (gate-on voltage or voltage having low level).

Figure 14:
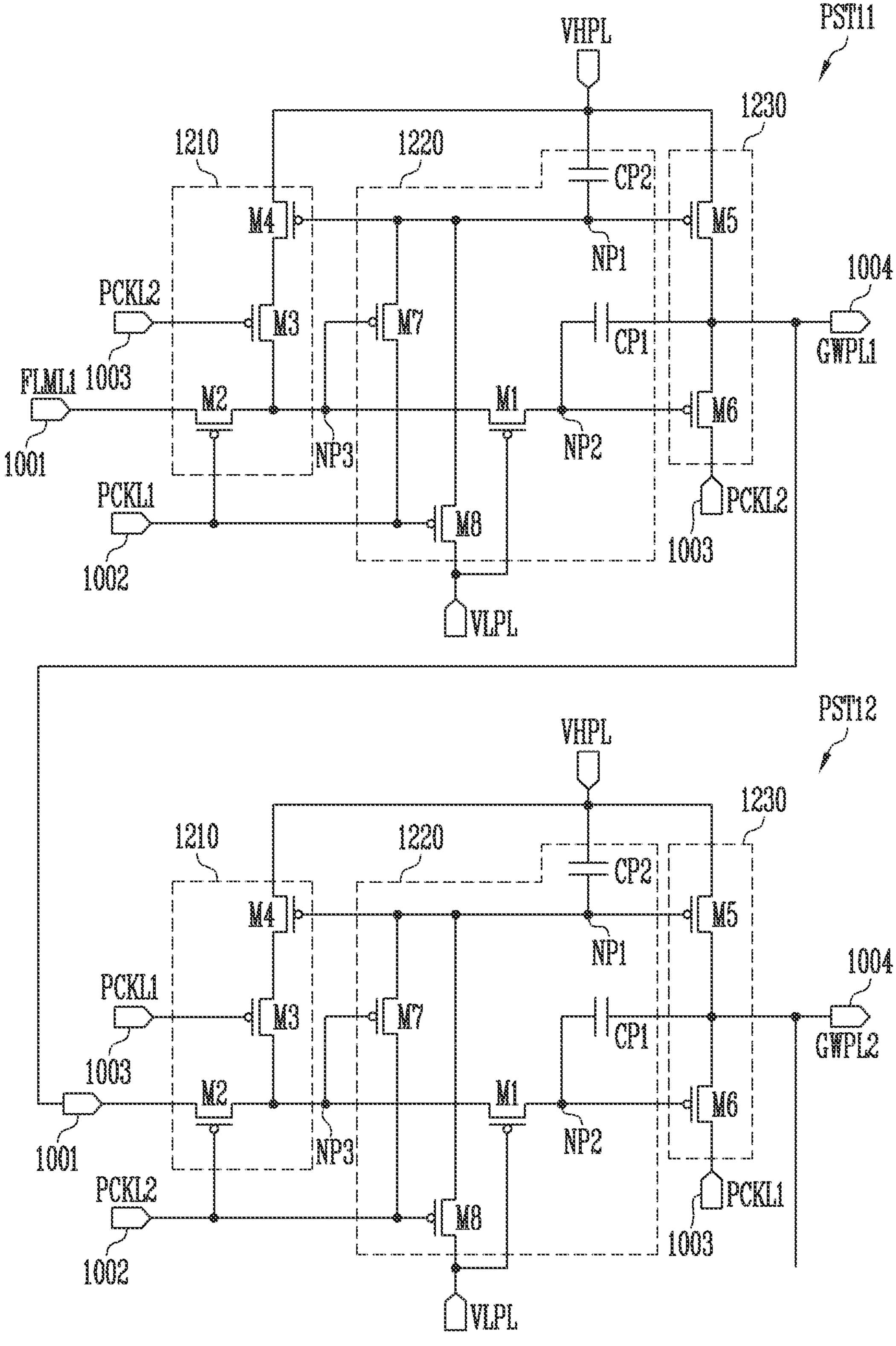
FIG. 14 is a diagram illustrating a scan stage of the first scan driver shown in FIG. 13.

FIG. 14 is a diagram illustrating the scan stage of the first scan driver shown in FIG. 13.

For convenience of description, the first scan stage PST11 and a second scan stage PST12 are illustrated in FIG. 14. Referring to FIG. 14, the scan stage PST11 may include a first driver 1210, a second driver 1220, and an output unit (buffer) 1230.

The output unit 1230 controls a voltage supplied to the output terminal 1004, corresponding to (e.g., according to) voltages of a node NP1 and a second node NP2. To this end, the output unit 1230 includes a transistor M5 and a transistor M6.

The transistor M5 is located between the power line VHPL and the output terminal 1004, and a gate electrode of the transistor M5 is connected to the node NP1. The transistor M5 controls connection between the power line VHPL and the output terminal 1004, corresponding to (e.g., according to) a voltage applied to the node NP1.

The transistor M6 is located between the output terminal 1004 and the third input terminal 1003, and a gate electrode of the transistor M6 is connected to the node NP2. The transistor M6 controls connection between the output terminal 1004 and the third input terminal 1003, corresponding to (e.g., according to) a voltage applied to the node NP2. The output unit 1230 is driven as a buffer. Additionally, the output unit 1230 may be configured by connecting a plurality of transistors in parallel. For example, in some embodiments, each of the transistors M5 and M6 may be implemented as a plurality of transistors in parallel.

The first driver 1210 controls a voltage of a node NP3, corresponding to (e.g., according to) signals supplied to the first input terminal 1001 to the third input terminal 1003. To this end, the first driver 1210 includes a transistor M2 to a transistor M4 (e.g., transistors M2, M3, and M4).

The transistor M2 is located between the first input terminal 1001 and the node NP3, and a gate electrode of the transistor M2 is connected to the second input terminal 1002. The transistor M2 controls connection between the first input terminal 1001 and the node NP3, corresponding to (e.g., according to) the signal supplied to the second input terminal 1002.

The transistor M3 and the transistor M4 are connected in series between the node NP3 and the power line VHPL. The transistor M3 is located between the transistor M4 and the node NP3, and a gate electrode of the transistor M3 is connected to the third input terminal 1003. The transistor M3 controls connection between the transistor M4 and the node NP3, corresponding to (e.g., according to) the signal supplied to the third input terminal 1003.

The transistor M4 is located between the transistor M3 and the power line VHPL, and a gate electrode of the transistor M4 is connected to the node NP1. The transistor M4 controls connection between the transistor M3 and the power line VHPL, corresponding to (e.g., according to) the voltage of the node NP1.

The second driver 1220 controls the voltage of the node NP1, corresponding to (e.g., according to) voltages of the second input terminal 1002 and the node NP3. To this end, the second driver 1220 includes a transistor M1, a transistor M7, a transistor M8, a capacitor CP1, and a capacitor CP2.

The capacitor CP1 is connected between the node NP2 and the output terminal 1004. The capacitor CP1 charges a voltage corresponding to (e.g., according to) a turn-on (e.g., turn-on state) and a turn-off (e.g., turn-off state) of the transistor M6.

The second capacitor CP2 is connected between the node NP1 and the power line VHPL. The capacitor CP2 charges the voltage applied to the node NP1.

The transistor M7 is located between the node NP1 and the second input terminal 1002, and a gate electrode of the transistor M7 is connected to the node NP3. The transistor M7 controls connection between the node NP1 and the second input terminal 1002, corresponding to (e.g., according to) the voltage of the node NP3.

The transistor M8 is located between the node NP1 and the power line VLPL, and a gate electrode of the transistor M8 is connected to the second input terminal 1002. The transistor M8 controls connection between the node NP1 and the power line VLPL, corresponding to (e.g., according to) the voltage of the second input terminal 1002.

The transistor M1 is located between the node NP3 and the node NP2, and a gate electrode of the transistor M1 is connected to the power line VLPL. The transistor M1 maintains (e.g., provides) electrical connection between the node NP3 and the node NP2 while maintaining (e.g., having) a turn-on state of the transistor M1. Additionally, the transistor M1 restricts a voltage drop width of the node NP3, corresponding to the voltage of the node NP2. For example, although the voltage of the node NP2 is dropped to a voltage lower than that of the power line VLPL, the voltage of the node NP3 is not lower than that obtained by subtracting a threshold voltage of the transistor M1 from the voltage of the power line VLPL.

Figure 15:
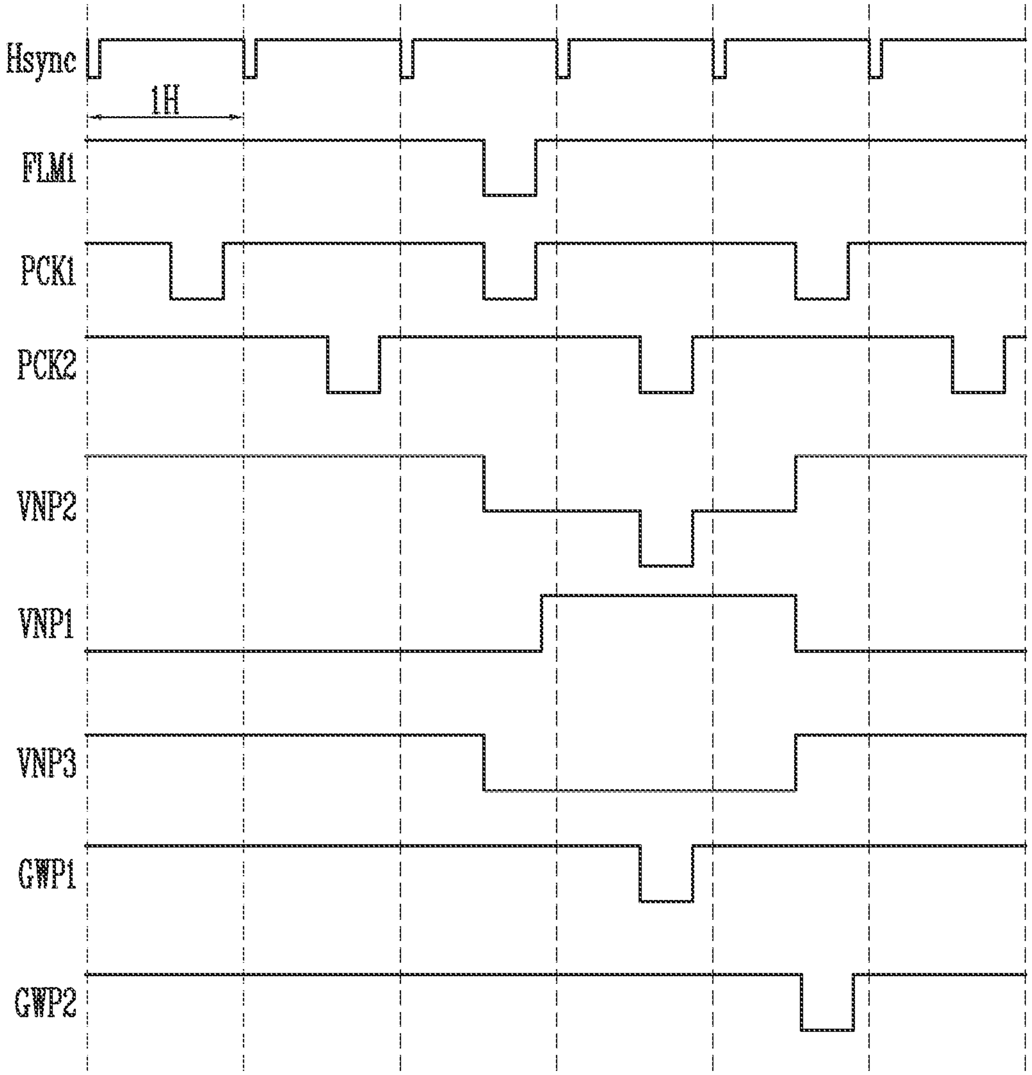
FIG. 15 is a diagram illustrating a driving method of the scan stage shown in FIG. 14.

FIG. 15 is a diagram illustrating a driving method of the scan stage shown in FIG. 14.

For convenience of description, an operating process utilizing the first scan stage PST11 will be described in FIG. 15.

Referring to FIG. 15, a clock signal PCK1 and a clock signal PCK2 have a cycle of two horizontal periods 2H, and are supplied in different horizontal periods. For example, the clock signal PCK2 is set as a signal shifted by a half cycle (i.e., one horizontal period 1H) with respect to the clock signal PCK1. In addition, a first scan start signal FLM1 supplied to the first input terminal 1001 may be supplied to be synchronized with the clock signal PCK1 supplied to the second input terminal 1002.

The supply of signals may mean that the signals have a turn-on level (here, a low level). The suspension of the supply of signals may mean that the signals have a turn-off level (here, a high level).

Additionally, the first input terminal 1001 may be set to a voltage having a low level when the first scan start signal FLM1 is supplied, and may be set to a voltage having a high level when the first scan start signal FLM1 is not supplied. In addition, the second input terminal 1002 and the third input terminal 1003 may be set to a voltage having a low level when a clock signal is supplied to the second input terminal 1002 and the third input terminal 1003, and may be set to a voltage having a high level when the clock signal is not supplied to the second input terminal 1002 and the third input terminal 1003.

The operating process will be described in more detail. First, the first scan start signal FLM1 is supplied to be synchronized with the clock signal PCK1.

When the clock signal PCK1 is supplied, the transistor M2 and the transistor M8 are turned on. When the transistor M2 is turned on, the first input terminal 1001 and the node NP3 are electrically connected to each other. Because the transistor M1 is set to a turn-on state in a majority of period (e.g., during a majority of the time), the node NP2 maintains electrical connection with the node NP3.

When the first input terminal 1001 and the node NP3 are electrically connected to each other, voltages VNP2 and VNP3 of the node NP2 and the node NP3 are set to a low level by the first scan start signal FLM1 supplied to the first input terminal 1001. When the voltages VNP2 and VNP3 of the node NP2 and the node NP3 are set to the low level, the transistor M6 and the transistor M7 are turned on.

When the transistor M6 is turned on, the third input terminal 1003 and the output terminal 1004 are electrically connected to each other. The third input terminal 1003 is set to a voltage having a high level (e.g., the clock signal PCK2 is not supplied), and accordingly, the voltage having the high level is also output to the output terminal 1004. When the transistor M7 is turned on, the second input terminal 1002 and the node NP1 are electrically connected to each other. A voltage VNP1 of the node NP1 is set to a low level according to the clock signal PCK1 supplied to the second input terminal 1002.

Additionally, when the clock signal PCK1 is supplied, the transistor M8 is turned on. When the transistor M8 is turned on, a voltage of the power line VLPL is supplied to the node NP1. The voltage of the power line VLPL is set to a voltage equal (or similar) to a low level of the clock signal PCK1, and accordingly, the node NP1 stably maintains a voltage having a low level.

When the node NP1 is set to the voltage having the low level, the transistor M4 and the transistor M5 are turned on. When the transistor M4 is turned on, the power line VHPL and the transistor M3 are electrically connected to each other. Because the transistor M3 is set to a turn-off state, the node NP3 stably maintains a voltage having a low level even when the transistor M4 is turned on. When the transistor M5 is turned on, a voltage of the power line VHPL is supplied to the output terminal 1004. The voltage of the power line VHPL is set to a voltage equal (or similar) to a voltage having a high level, which is supplied to the input terminal 1003, and accordingly, the output terminal 1004 stably maintains a voltage having a high level.

Subsequently, the supply of the first scan start signal FLM1 and the clock signal PCK1 is suspended. When the supply of the clock signal PCK1 is suspended, the transistor M2 and the transistor M8 are turned off. The transistor M6 and the transistor M7, which correspond to a voltage stored in the capacitor CP1, maintain the turn-on state. For example, the voltage stored in the capacitor CP1 is applied to the gate electrode of the transistor M6 and to the gate electrode of the transistor M7. For example, the node NP2 and the node NP3 maintain a voltage having a low level due to the voltage stored in the capacitor CP1.

When the transistor M6 maintains the turn-on state, electrical connection between the output terminal 1004 and the third input terminal 1003 is maintained. When the transistor M7 maintains the turn-on state, the node NP1 maintains electrical connection with the second input terminal 1002. The voltage of the second input terminal 1002 is set to a voltage having a high level, corresponding to when the supply of the clock signal PCK1 is suspended, and accordingly, the node NP1 is also set to a voltage having a high level. When the voltage having the high level is supplied to the node NP1, the transistor M4 and transistor M5 are turned off.

Subsequently, the clock signal PCK2 is supplied to the third input terminal 1003. Because the transistor M6 is set to the turn-on state, the clock signal PCK2 supplied to the third input terminal 1003 is supplied to the output terminal 1004. The output terminal 1004 outputs the clock signal PCK2 as a scan signal GWP1 having a turn-on level to a first scan line GWPL1.

Meanwhile, when the clock signal PCK2 is supplied to the output terminal 1004, the voltage VNP2 of the node NP2 is dropped to a voltage lower than that of the power line VLPL due to coupling of the capacitor CP1, and accordingly, the transistor M6 stably maintains the turn-on state.

Meanwhile, although the voltage VNP2 of the node NP2 is dropped, the node NP3 may maintain approximately a voltage of the power line VLPL (e.g., the voltage obtained by subtracting the threshold voltage of the transistor M1 from the voltage of the power line VLPL).

After the scan signal GWP1 having the turn-on level is output to the first scan line GWPL1, the supply of the clock signal PCK2 is suspended. When the supply of the clock signal PCK2 is suspended, the output terminal 1004 outputs a voltage having a high level. In addition, the voltage VNP2 of the node NP2 is increased to approximately to the voltage of the power line VLPL, corresponding to the voltage having the high level.

Subsequently, the clock signal PCK1 is supplied. When the clock signal PCK1 is supplied, the transistor M2 and the transistor M8 are turned on. When the transistor M2 is turned on, the first input terminal 1001 and the node NP3 are electrically connected to each other. The first scan start signal FLM1 is not supplied to the first input terminal 1001, and accordingly, is set to a voltage having a high level. Thus, when the transistor M1 is turned on, a voltage having a high level is supplied to the node NP3 and the node NP2, and accordingly, the transistor M6 and the transistor M7 are turned off.

When the transistor M8 is turned on, the voltage of the power line VLPL is supplied to the node NP1, and accordingly, the transistor M4 and the transistor M5 are turned on. When the transistor M5 is turned on, the voltage of the power line VHPL is supplied to the output terminal 1004. Subsequently, the transistor M4 and transistor M5 maintain the turn-on state, corresponding to a voltage charged in the capacitor CP2, and accordingly, the output terminal 1004 is stably supplied with the voltage of the power line VHPL.

Additionally, when the clock signal PCK2 is supplied, the transistor M3 is turned on. Because the transistor M4 is set to the turn-on state, the voltage of the power line VHPL is supplied to the node NP3 and the node NP2. The transistor M6 and the transistor M7 stably maintain the turn-off state.

The second scan stage PST12 is supplied with an output signal (e.g., a scan signal) of the first scan stage PST11 to be synchronized with the clock signal PCK2. The second scan stage PST12 outputs a scan signal GWP2 having a turn-on level to a second scan line GWPL2 to be synchronized with the clock signal PCK1. The scan stages PST11 to PST14 sequentially output a scan signal having a turn-on level to scan lines GWPL1 to GWPL4 by repeating the above-described process.

Figure 16:
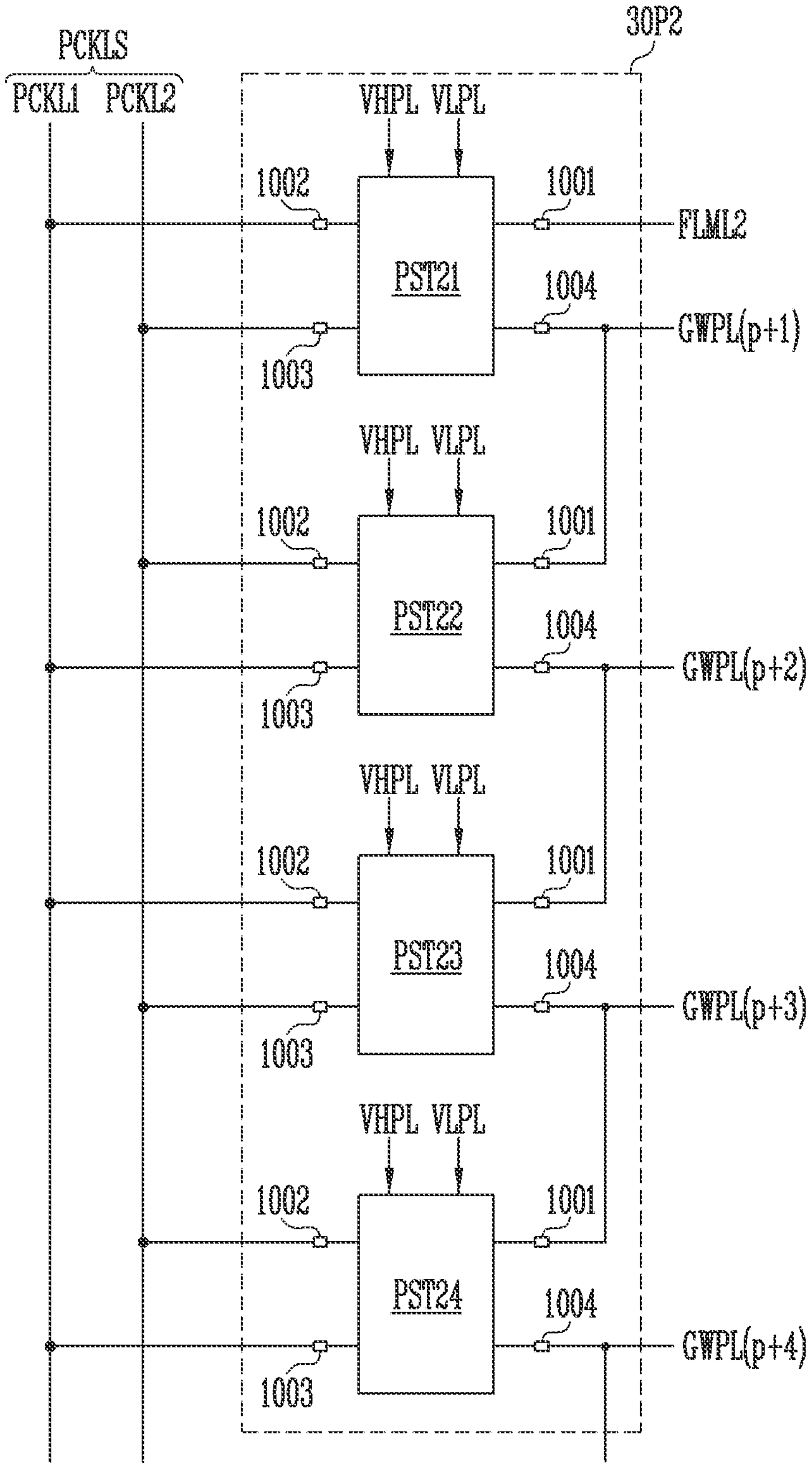
FIG. 16 is a diagram illustrating a second scan driver in accordance with an embodiment of the present disclosure.

FIG. 16 is a diagram illustrating a second scan driver in accordance with an embodiment of the present disclosure.

Referring to FIG. 16, the second scan driver 30P2 may include scan stages PST21 to PST24. The scan stages PST21 to PST24 may be connected to corresponding scan lines GWPL(p+1) to GWPL(p+4) and scan clock lines PCKLS. The scan stages PST21 to PST24 may be implemented with the same circuit.

Each of the scan stages PST21 to PST24 may include a first input terminal 1001, a second input terminal 1002, a third input terminal 1003, and an output terminal 1004.

The first input terminal 1001 of a first scan stage PST21 may be connected to the second scan start line FLML2. The first input terminal 1001 of each of the other scan stages PST22 to PST24 may be connected to a scan line (or carry line) of a previous scan stage. In an example, the first input terminal 1001 of the first scan stage PST21 is supplied with a first scan start signal, and the first input terminal 1001 of each of the other scan stages PST22 to PST24 is supplied with an output signal (e.g., scan signal or carry signal) of a previous stage.

The second input terminal 1002 of a kth (k is an odd or even number) scan stage may be connected to the clock line PCKL1, and the third input terminal 1003 of the kth scan stage may be connected to the clock line PCKL2. For example, as shown in FIG. 16, the number k is an odd number. The second input terminal 1002 of a (k+1)th scan stage may be connected to the clock line PCKL2, and the third input terminal 1003 of the (k+1)th scan stage may be connected to the clock line PCKL1.

Pulses of the clock signals PCK1 and PCK2 applied to the clock lines PCKL1 and PCKL2 have the same cycle (e.g., two horizontal periods 2H) but have different phases. Therefore, the pulses of the clock signals PCK1 and PCK2 may not overlap with each other.

Also, each of the scan stages PST21 to PST24 may be connected to the power line VHPL and the power line VLPL. The voltage of the power line VHPL may be set to a turn-off level. In addition, the voltage of the power line VLPL may be set to a turn-on level.

A circuit configuration of the scan stages PST21 to PST24 may be identical to that of the above-described scan stages PST11 to PST14, and therefore, overlapping descriptions may not be repeated.

Figure 17:
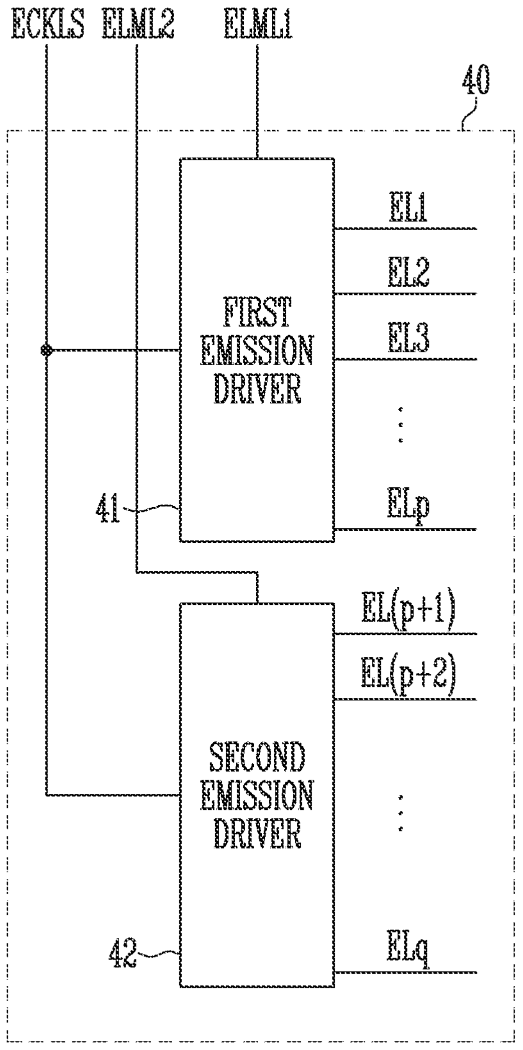
FIG. 17 is a diagram illustrating an emission driver in accordance with an embodiment of the present disclosure.

FIG. 17 is a diagram illustrating an emission driver in accordance with an embodiment of the present disclosure.

Referring to FIG. 17, the emission driver 40 in accordance with the embodiment of the present disclosure may include a first emission driver 41 and a second emission driver 42.

The first emission driver 41 may be connected to a first emission stop line ELML1, emission clock lines ECKLS, and emission lines EL1, EL2, EL3, . . . , and ELp. At least one of emission clock signals supplied to the first emission driver 41 through the emission clock lines ECLKS may be referred to as a first emission clock signal.

The second emission driver 42 may be connected to a second emission stop line ELML2, emission clock lines ECKLS, and emission lines EL(p+1), EL(p+2), . . . , ELq. At least one of emission clock signals supplied to the second emission driver 42 through the emission clock lines ECKLS may be referred to as a second emission clock signal. The second emission driver 42 may be connected to the same emission clock lines ECKLS as the first emission driver 41. In some embodiments, the second emission driver 42 may be connected to the second emission stop line ELML2 independent from the first emission stop line ELML1 of the first emission driver 41. For example, the second emission driver 42 may be connected to a different emission stop line than the first emission driver 41, and the first emission stop signal and the second emission stop signal may be different. A first emission line EL(p+1) of the second emission driver 42 may correspond to a next emission line of the last emission line ELp of the first emission driver 41.

Figure 18:
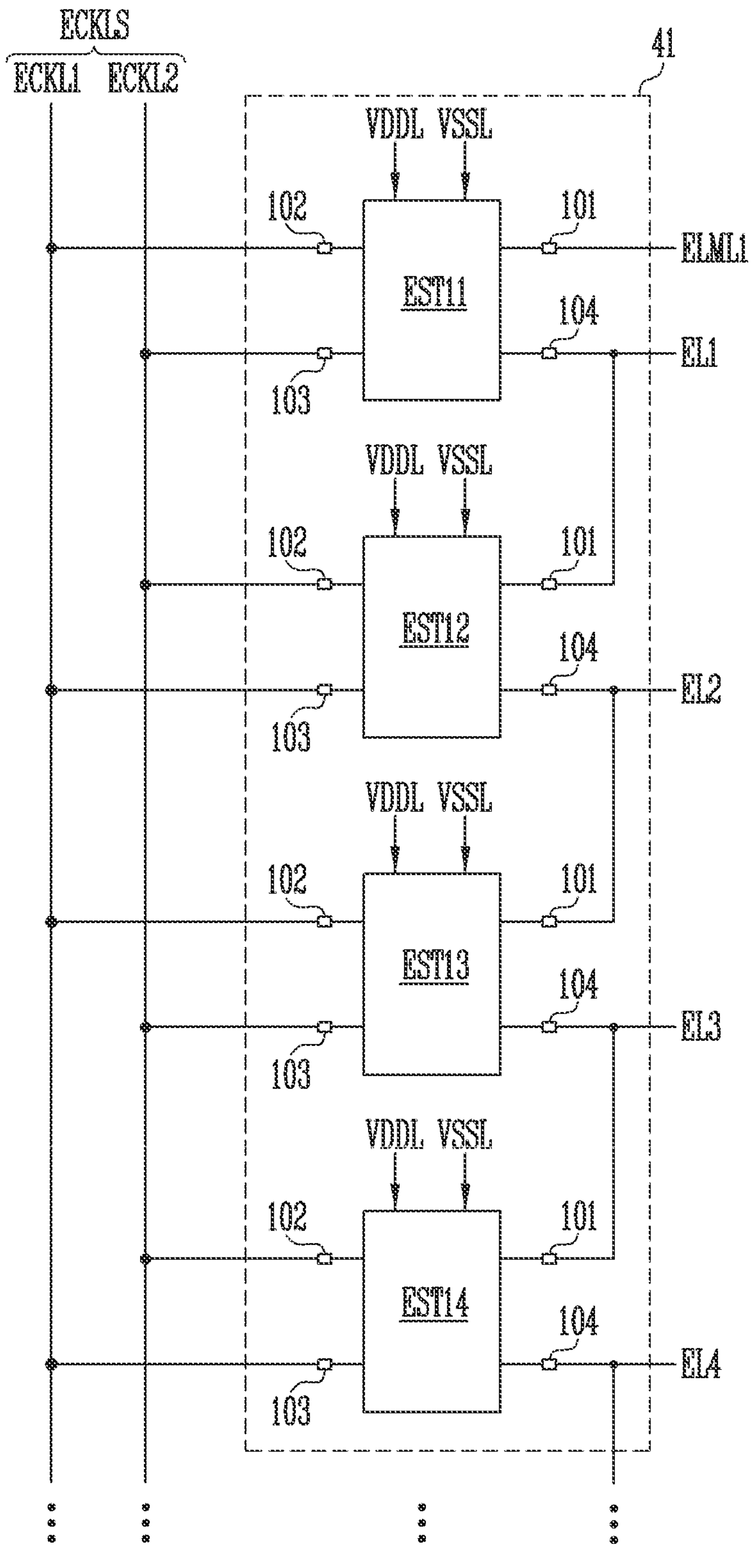
FIG. 18 is a diagram illustrating a first emission driver in accordance with an embodiment of the present disclosure.

FIG. 18 is a diagram illustrating a first emission driver in accordance with an embodiment of the present disclosure.

Referring to FIG. 18, the first emission driver 41 may include a plurality of emission stages EST11 to EST14. For convenience of description, four emission stages EST11 to EST14 are illustrated in FIG. 18. The emission stages EST11 to EST14 may be respectively connected to corresponding emission lines EL1 to EL4, and may be commonly connected to the emission clock lines ECKLS. The emission stages EST11 to EST14 may have the substantially same circuit structure.

Each of the emission stages EST11 to EST14 may include a first input terminal 101, a second input terminal 102, a third input terminal 103, and an output terminal 104.

The first input terminal 101 may receive an output signal (e.g., emission signal or carry signal) of a previous emission stage or a first emission stop signal. In an example, the first input terminal 101 of a first emission stage EST11 may be connected to the first emission stop line ELML1, and the first input terminal 101 of each of the other emission stages EST12 to EST14 may be connected to the emission line of a previous emission stage.

The second input terminal 102 of an lth (l is an odd or even number) emission stage may be connected to a clock line ECKL1, and the third input terminal 103 of the lth emission stage may be connected to a clock line ECKL2. For example, as shown in FIG. 18, l may be an odd number. In addition, the second input terminal 102 of an (l+1)th emission stage may be connected to the clock line ECKL2, and the third input terminal 103 of the (l+1)th emission stage may be connected to the clock line ECKL1. For example, the clock line ECKL1 and the clock line ECKL2 may be alternately connected to the second input terminal 102 and the third input terminal 103 of each emission stage.

Figure 20:
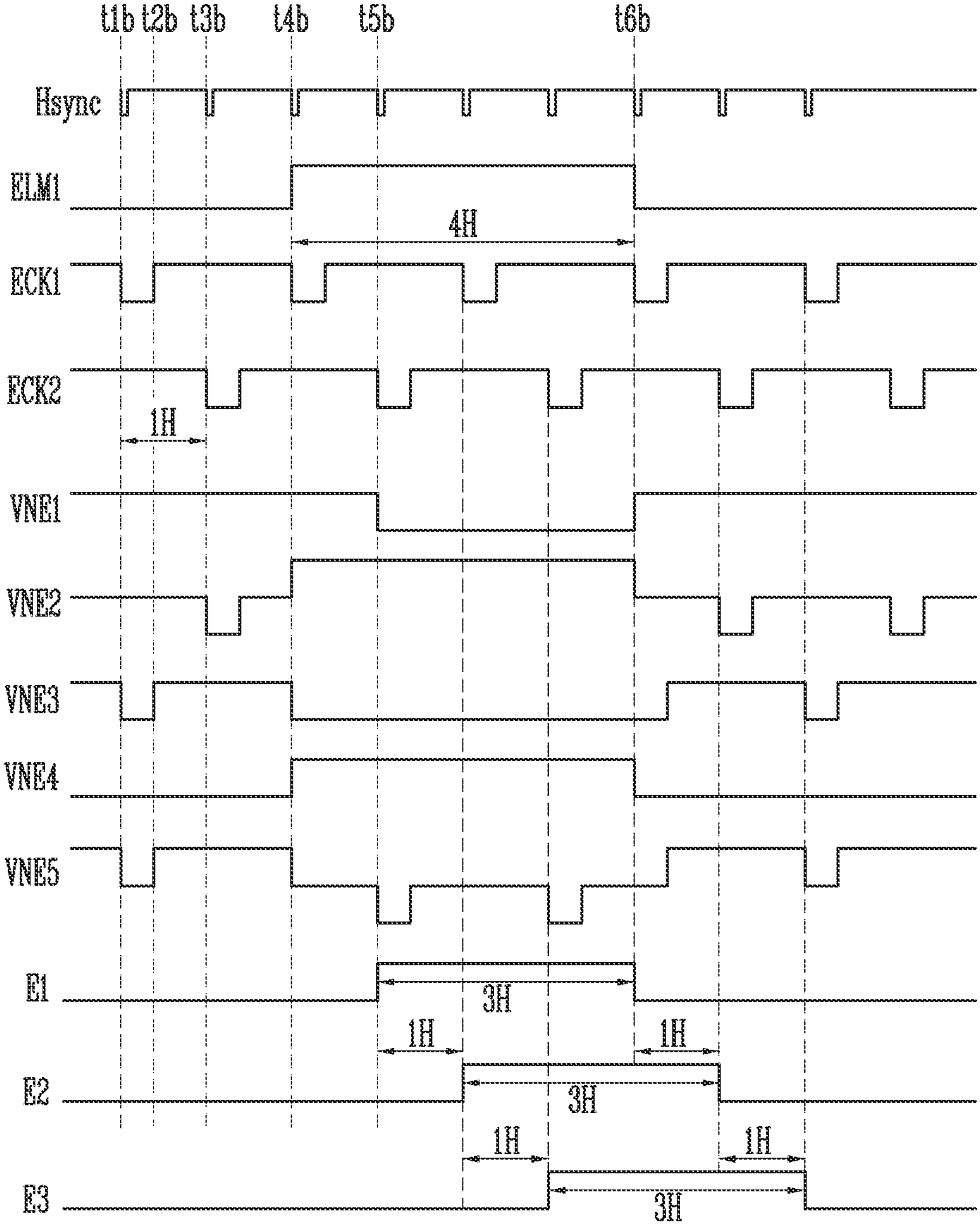
FIG. 20 is a diagram illustrating a driving method of the emission stage shown in FIG. 19.

Pulses of a clock signal ECK1 applied to the clock line ECKL1 and pulses of a clock signal ECK2 applied to the clock line ECKL2 do not temporally overlap with each other (see FIG. 20). Each pulse may have a turn-on level.

The emission stages EST11 to EST14 may be connected to a power line VDDL and a power line VSSL. The voltage of the power line VDDL may be set to a turn-off level, and the voltage of the power line VSSL may be set to a turn-on level. The voltage level of an emission signal may be set based on the voltage of one of the power line VDDL and the power line VSSL.

Figure 19:
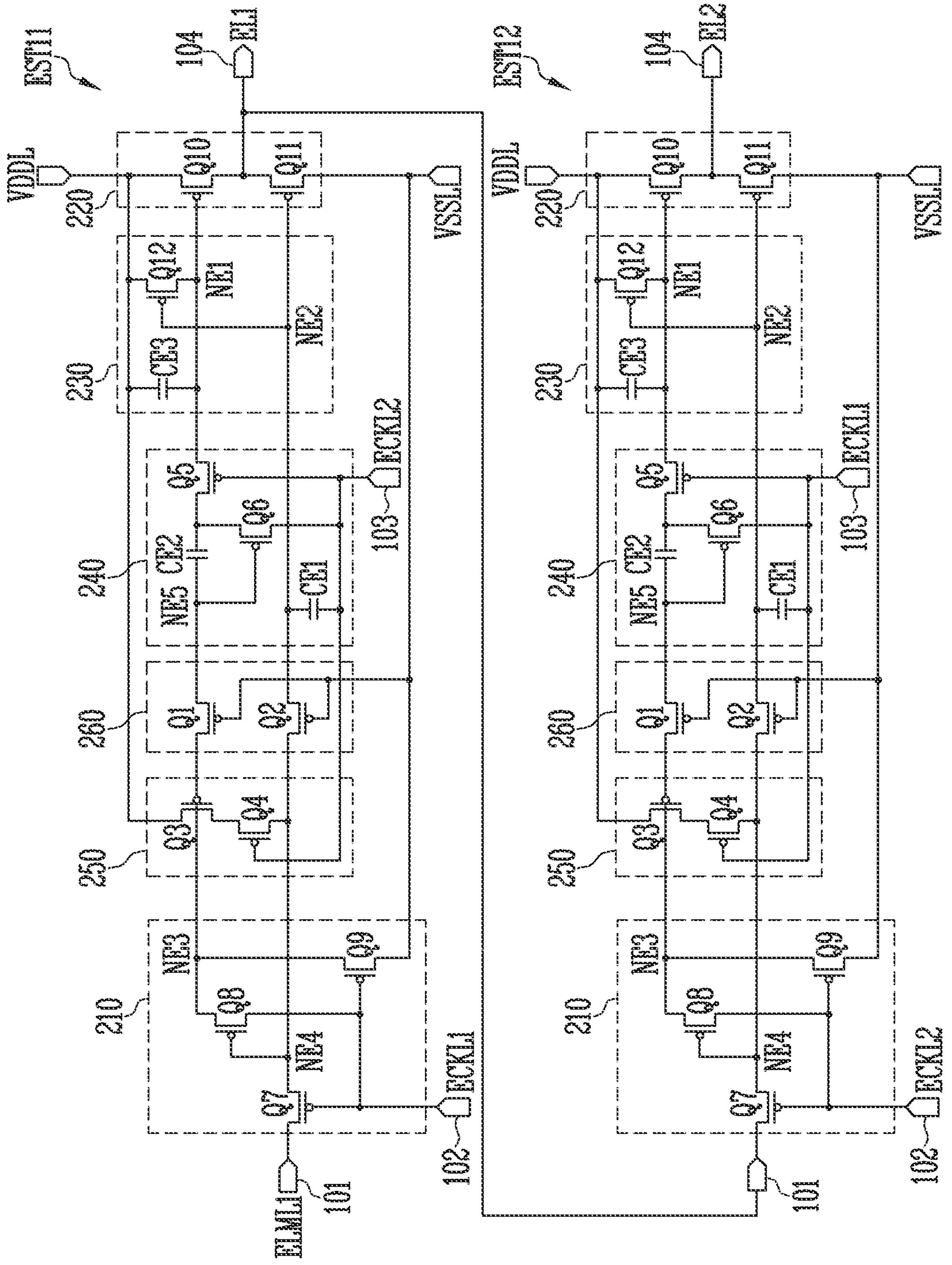
FIG. 19 is a diagram illustrating an emission stage of the first emission driver shown in FIG. 18.

FIG. 19 is a diagram illustrating the emission stage of the first emission driver shown in FIG. 18.

Referring to FIG. 19, the emission stage EST11 may include an input unit 210, an output unit 220, a first signal processor 230, a second signal processor 240, a third signal processor 250, and a first stabilizer 260.

The output unit 220 may supply a voltage of the power line VDDL or the power line VSSL to the output terminal 104, corresponding to (e.g., according to) voltages of a node NE1 and a node NE2. To this end, the output unit 220 may include a transistor Q10 and a transistor Q11.

The transistor Q10 may be connected between the power line VDDL and the output terminal 104. In addition, a gate electrode of the transistor Q10 may be connected to the node NE1. The transistor Q10 may be turned on or turned off corresponding to (e.g., according to) the voltage of the node NE1. The voltage of the power line VDDL, which is supplied to the output terminal 104 when the transistor Q10 is turned on, may be output as an emission signal having a turn-off level through the emission line EL1.

The transistor Q11 may be connected between the output terminal 104 and the power line VSSL. In addition, a gate electrode of the transistor Q11 may be connected to the node NE2. The transistor Q11 may be turned on or turned off corresponding to the voltage of the node NE2. The voltage of the power line VSSL, which is supplied to the output terminal 104 when the transistor Q11 is turned on, may be output as an emission signal having a turn-on level through the emission line EL1.

The input unit 210 may control voltages of a node NE3 and a node NE4, corresponding to (e.g., according to) signals supplied to the first input terminal 101 and the second input terminal 102. To this end, the input unit 210 may include a transistor Q7, a transistor Q8, and a transistor Q9.

The transistor Q7 may be connected between the first input terminal 101 and the node NE4. In addition, a gate electrode of the transistor Q7 may be connected to the second input terminal 102. The transistor Q7 may be turned on when a clock signal having a turn-on level is supplied to the second input terminal 102, to electrically connect the first input terminal 101 and the node NE4.

The transistor Q8 may be connected between the node NE3 and the second input terminal 102. In addition, a gate electrode of the transistor Q8 may be connected to the node NE4. The transistor Q8 may be turned on or turned off corresponding to (e.g., according to) the voltage of the node NE4.

The transistor Q9 may be connected between the node NE3 and the power line VSSL. In addition, a gate electrode of the transistor Q9 may be connected to the second input terminal 102. The transistor Q9 may be turned on when a clock signal having a turn-on level is supplied to the second input terminal 102, to supply the voltage of the power line VSSL to the node NE3.

The first signal processor 230 may control the voltage of the node NE1, corresponding to (e.g., according to) the voltage of the node NE2. To this end, the first signal processor 230 may include a transistor Q12 and a capacitor CE3.

The transistor Q12 may be connected between the power line VDDL and the node NE1. In addition, a gate electrode of the transistor Q12 may be connected to the node NE2. The transistor Q12 may be turned on or turned off corresponding to (e.g., according to) the voltage of the node NE2.

The capacitor CE3 may be connected between the power line VDDL and the node NE1. The capacitor CE3 may maintain a voltage applied to the node NE1.

The second signal processor 240 may be connected to a node NE5, and may control the voltage of the node NE1, corresponding to (e.g., according to) a signal supplied to the third input terminal 103. To this end, the second signal processor 240 may include transistor Q5, a transistor Q6, a capacitor CE1, and a capacitor CE2.

The capacitor CE1 may be connected between the node NE2 and the third input terminal 103. The capacitor CE1 may maintain a voltage difference between the third input terminal 103 and the node NE2.

A first electrode of the capacitor CE2 may be connected to the node NE5, and a second electrode of the capacitor CE2 may be connected to the transistor Q5.

The transistor Q5 may be connected between the second electrode of the capacitor CE2 and the node NE1. In addition, a gate electrode of the transistor Q5 may be connected to the third input terminal 103. The transistor Q5 may be turned on when a clock signal is supplied to the third input terminal 103, to electrically connect the second electrode of the capacitor CE2 and the node NE1.

The transistor Q6 may be connected between the second electrode of the capacitor CE2 and the third input terminal 103. In addition, a gate electrode of the transistor Q6 may be connected to the node NE5.

The third signal processor 250 may control the voltage of the node NE4, corresponding to (e.g., according to) the voltage of the node NE3 and the signal supplied to the third input terminal 103. To this end, the third signal processor 250 may include a transistor Q3 and a transistor Q4.

The transistor Q3 and the transistor Q4 may be connected in series between the power line VDDL and the node NE4. A gate electrode of the transistor Q3 may be connected to the node NE3. In addition, a gate electrode of the transistor Q4 may be connected to the third input terminal 103.

The first stabilizer 260 may be connected between the second signal processor 240 and the input unit 210. The first stabilizer 260 may restrict voltage drop widths of the node NE3 and the node NE4. The first stabilizer 260 may include a transistor Q1 and a transistor Q2.

The transistor Q1 may be connected between the node NE3 and the node NE1. In addition, a gate electrode of the transistor Q1 may be connected to the power line VSSL. The transistor Q2 may be connected between the node NE2 and the node NE4. In addition, a gate electrode of the transistor Q2 may be connected to the power line VSSL.

Meanwhile, a configuration of a second emission stage EST12 may have a configuration substantially identical to that of the first emission stage EST11, except for signals supplied to the first input terminal 101, the second input terminal 102, and the third input terminal 103. Therefore, overlapping descriptions of the second emission stage EST12 may not be repeated.

FIG. 20 is a diagram illustrating a driving method of the emission stage shown in FIG. 19.

In FIG. 20, an operating process will be described based on the first emission stage EST11.

Referring to FIG. 20, each of pulses of a clock signal ECK1 and pulses of a clock signal ECK2 has a cycle of two horizontal periods 2H, and the pulses of the clock signal ECK1 and the pulses of the clock signal ECK2 are generated in different horizontal periods. For example, the pulse of the clock signal ECK2 may be a signal shifted by a half cycle (e.g., one horizontal period 1H) with respect to the pulse of the clock signal ECK1.

A first emission stop signal ELM1 having a turn-off level (high level), which is supplied to the first input terminal 101, is set to overlap, at least once, with the clock signal ECK1 having a pulse of a turn-on level (low level), which is supplied to the second input terminal 102. To this end, the first emission stop signal ELM1 may be supplied during a width wider (e.g., for a longer time) than that of the clock signal ECK1. For example, the first emission stop signal ELM1 may be supplied for four horizontal periods 4H. In addition, a first emission signal E1 having a pulse of a turn-off level (high level), which is supplied to the first input terminal 101 of the second emission stage EST12, may overlap, at least once with the clock signal ECK2 having a pulse of a turn-on level (low level), which is supplied to the second input terminal 102 of the second emission stage EST12.

First, at a time t1*b*, the clock signal ECK1 having a low level is supplied to the second input terminal 102. For example, a pulse may be generated in the clock signal ECK1. Accordingly, the transistor Q7 and the transistor Q9 may be turned on.

When the transistor Q7 is turned on, the first input terminal 101 and the node NE4 may be electrically connected to each other. Because the transistor Q2 maintains a turn-on state, the first input terminal 101 may be electrically connected to the node NE2 via the node NE4. During the time t1*b*, a start pulse having a high level is not supplied to the first input terminal 101, and accordingly, a voltage VNE4 of the node NE4 and a voltage VNE2 of the node NE2 may be set to a low level.

When a voltage having a low level is supplied to the node NE2 and the node NE4, the transistor Q8, the transistor Q11, and the transistor Q12 may be turned on.

When the transistor Q12 is turned on, a voltage of the power line VDDL may be supplied, so that a voltage VNE1 of the node NE1 is set to a high level. Accordingly, the transistor Q10 may be turned off.

When the transistor Q11 is turned on, a voltage of the power line VSSL may be supplied to the output terminal 104. Therefore, at the time t1*b*, the emission signal E1 having a turn-on level (low level) may be supplied to the emission line EL1. When the transistor Q8 is turned on, the clock signal ECK1 is supplied to the node NE3. Because the transistor Q1 maintains the turn-on state, the clock signal ECK1 may be supplied to the node NE5 via the node NE3.

Meanwhile, when the transistor Q9 is turned on, the voltage of the power line VSSL is supplied to the node NE3 and the node NE5. The clock signal ECK1 may have a low level, and accordingly, voltages VNE3 and VNE5 of the node NE3 and the node NE5 may be set to a low level. Accordingly, the transistor Q3 and transistor Q6 are turned on.

When the transistor Q6 is turned on, the clock signal ECK2 having a high level is supplied from the third input terminal 103 to the second electrode of the capacitor CE2. Because the transistor Q5 is in a turn-off state, the node NE1 may maintain the voltage of the power line VDDL, regardless of voltages of the node NE5 and the second electrode of the capacitor CE2.

When the transistor Q3 is turned on, the voltage of the power line VDDL may be supplied to the transistor Q4. The transistor Q4 may be in the turn-off state, and accordingly, the node NE4 may maintain a low level.

At a time t2*b*, the clock signal ECK1 having a high level is supplied to the second input terminal 102. For example, the pulse may disappear in the clock signal ECK1. Accordingly, the transistor Q7 and the transistor Q9 may be turned off. The previous voltages of node NE2 and the node NE1 may be maintained by the capacitor CE1 and the capacitor CE3, and the transistor Q8, the transistor Q11, and the transistor Q12 may maintain the turn-on state.

When the transistor Q8 is turned on, the clock signal ECK1 having a high level is supplied from the second input terminal 102 to the node NE3 and the node NE5. Accordingly, the transistor Q3 and the transistor Q6 are set to the turn-off state.

At a time t3*b*, the clock signal ECK2 having a low level is supplied to the third input terminal 103. For example, a pulse is generated in the clock signal ECK2. Accordingly, the transistor Q4 and the transistor Q5 are turned on.

When the transistor Q5 is turned on, the second electrode of the capacitor CE2 and the node NE1 are electrically connected to each other. Because the transistor Q12 is in the turn-on state, the node NE1 maintains the voltage of the power line VDDL.

When the transistor Q4 is turned on, a second electrode of the transistor Q3 and the node NE2 are electrically connected to each other. Because the transistor Q3 is in the turn-off state, the voltage of the power line VDDL is not supplied to the node NE4 and the node NE2.

When the clock signal ECK2 having the low level is supplied to the third input terminal 103, the node NE2 is dropped to a voltage lower than that of the power line VSSL due to coupling of the capacitor CE1. Accordingly, voltages of the gate electrodes of the transistor Q11 and the transistor Q12 are lower than that of the power line VSSL, so that driving characteristics of the transistors can be improved.

The node NE4 may maintain approximately the voltage of the power line VSSL due to the transistor Q2, regardless of the voltage drop of the node NE2. For example, because the voltage of the power line VSSL is continuously applied to the gate electrode of the transistor Q2, the voltage of the node NE4 corresponding to a source electrode of the transistor Q2 is not dropped below a value obtained by adding a threshold voltage value to the voltage of the power line VSSL. Thus, a voltage difference between a first electrode and a second electrode of the transistor Q7 is minimized or reduced, so that a characteristic of the transistor Q7 can be prevented from being changed or so that a change of the characteristic of the transistor Q7 may be reduced or minimized.

At a time t4*b*, the first emission stop signal ELM1 having a turn-off level (high level) is supplied to the first input terminal 101, and the clock signal ECK1 having a low level is supplied to the second input terminal 102. For example, a pulse is generated in the clock signal ECK1. Accordingly, the transistor Q7 and the transistor Q9 are turned on.

When the transistor Q7 is turned on, the first input terminal 101 is electrically connected to the node NE4 and the node NE2. Therefore, the node NE4 and the node NE2 are charged with a voltage having a high level, and the transistor Q8, the transistor Q11, and the transistor Q12 are turned off.

When the transistor Q9 is turned on, the voltage of the power line VSSL is supplied to the node NE3 and the node NE5, and the transistor Q3 and the transistor Q6 are turned on. Because the transistor Q4 is turned off even when the transistor Q3 is turned on, the voltage of the node NE4 is maintained.

When the transistor Q6 is turned on, the second electrode of the capacitor CE2 and the third input terminal 103 are electrically connected to each other. Because the transistor Q5 is in the turn-off state, the node NE1 maintains a high level.

At a time t5b, the clock signal ECK2 having a low level is supplied to the third input terminal 103. For example, a pulse is generated in the clock signal ECK2. Accordingly, the transistor Q4 and the transistor Q5 are turned on. Because the node NE3 and the node NE5 are in a state in which they are charged with the voltage of the power line VSSL, the transistor Q3 and the transistor Q6 are in the turn-on state.

The clock signal ECK2 having a low level is applied to the node NE1 via the transistor Q5 and the transistor Q6, which are turned on, and the transistor Q10 is turned on. When the transistor Q10 is turned on, the voltage of the power line VDDL is supplied as the emission signal E1 to the output terminal 104. Therefore, the emission signal E1 having a turn-off level (high level) may be supplied to the emission line EL1.

When the transistor Q3 and the transistor Q4 are turned on, the voltage of the power line VDDL is supplied to the node NE4 and the node NE2. Accordingly, the transistor Q8 and the transistor Q11 can stably maintain the turn-off state.

Meanwhile, when the clock signal ECK2 having a low level is supplied to the second electrode of the capacitor CE2, the voltage of the node NE5 is dropped to a voltage lower than that of the power line VSSL due to coupling of the capacitor CE2. Accordingly, the voltage applied to the gate electrode of the transistor Q6 is dropped to a voltage lower than that of the power line VSSL, and a driving characteristic of the transistor Q6 can be improved.

The voltage of the node NE3 may maintain approximately the voltage of the power line VSSL by the transistor Q1, regardless of the voltage of the node NE5. For example, because the voltage of the power line VSSL is continuously applied to the gate electrode of the transistor Q1, the voltage of the node NE3 corresponding to a source electrode of the transistor Q1 is not dropped below a value obtained by adding a threshold voltage value (e.g., a threshold voltage value of the transistor Q1) to the voltage of the power line VSSL. Therefore, the node NE3 may maintain approximately the voltage of the power line VSSL, regardless of the voltage drop of the node NE5. A voltage difference between a source electrode and a drain electrode of the transistor Q8 is minimized or reduced, so that a characteristic of the transistor Q8 can be prevented from being changed or so that a change of the characteristic of the transistor Q8 may be reduced or minimized.

At a time t6b, the clock signal ECK1 having a low level is supplied to the second input terminal 102. For example, a pulse may be generated in the clock signal ECK1. Accordingly, the transistor Q7 and the transistor Q9 are turned on.

When the transistor Q7 is turned on, the node NE4 and the node NE2 are electrically connected to the first input terminal 101, and accordingly, a voltage having a low level is supplied from the first input terminal 101 to the node NE4 and the node NE2. Therefore, the transistor Q8, the transistor Q11, and the transistor Q12 are turned on.

When the transistor Q8 is turned on, the clock signal ECK1 having a low level is supplied to the node NE3 and the node NE5.

When the transistor Q12 is turned on, the voltage of the power line VDDL is supplied to the node NE1, and the transistor Q10 is turned off.

When the transistor Q11 is turned on, the voltage of the power line VSSL is supplied to the output terminal 104. Therefore, the emission signal E1 having a turn-on level (low level) may be supplied to the emission line EL1.

Meanwhile, the second emission stage EST12 supplied with the emission signal E1 having a turn-off level from the output terminal 104 of the first emission stage EST11 supplies an emission signal E2 having a turn-off level to the emission line EL2 by repeating the above-described process. For example, the emission stages EST11 to EST14 in accordance with the embodiment of the present disclosure may supply emission signals to the emission lines EL1 to EL4 by repeating the above-described process.

Figure 21:
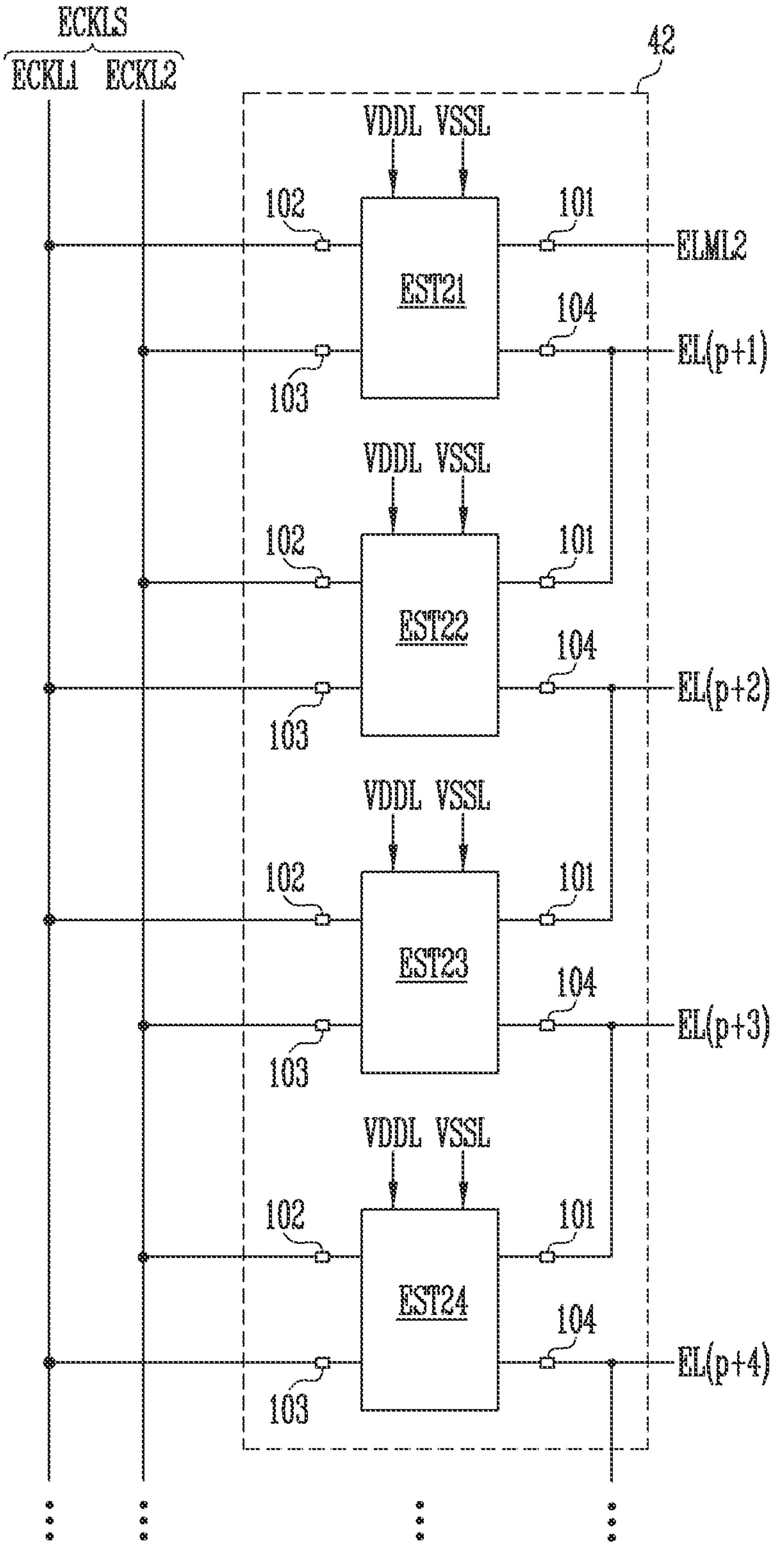
FIG. 21 is a diagram illustrating a second emission driver in accordance with an embodiment of the present disclosure.

FIG. 21 is a diagram illustrating a second emission driver in accordance with an embodiment of the present disclosure.

Referring to FIG. 21, the second emission driver 42 may include a plurality of emission stages EST21 to EST24. For convenience of description, four emission stages EST21 to EST24 are illustrated in FIG. 21. The emission stages EST21 to EST24 may be respectively connected to corresponding emission lines EL(p+1) to EL(p+4), and may be commonly connected to the emission clock lines ECKLS. The emission stages EST21 to EST24 may have the substantially same circuit structure.

Each of the emission stages EST21 to EST24 may include a first input terminal 101, a second input terminal 102, a third input terminal 103, and an output terminal 104.

The first input terminal 101 may receive an output signal (e.g., emission signal or carry signal) of a previous emission stage or a second emission stop signal ELM2. In an example, the first input terminal 101 of a first emission stage EST21 may be connected to the second emission stop line ELML2, and the first input terminal 101 of each of the other emission stages EST22 to EST24 may be connected to the emission line of a previous emission stage.

The second input terminal 102 of an hth (h is an odd or even number) emission stage may be connected to a clock line ECKL1, and the third input terminal 103 of the hth emission stage may be connected to a clock line ECKL2. For example, as shown in FIG. 21, h may be an odd number. In addition, the second input terminal 102 of an (h+1)th emission stage may be connected to the clock line ECKL2, and the third input terminal 103 of the (h+1)th emission stage may be connected to the clock line ECKL1. For example, the clock line ECKL1 and the clock line ECKL2 may be alternately connected to the second input terminal 102 and the third input terminal 103 of each emission stage.

Pulses of a clock signal ECK1 applied to the clock line ECKL1 and pulses of a clock signal ECK2 applied to the clock line ECKL2 do not temporally overlap with each other. Each pulse may have a turn-on level.

The emission stages EST21 to EST24 may be connected to a power line VDDL and a power line VSSL. The voltage of the power line VDDL may be set to a turn-off level, and the voltage of the power line VSSL may be set to a turn-on level. The voltage level of an emission signal may be set based on the voltage of one of the power line VDDL and the power line VSSL.

A circuit configuration of the emission stages EST21 to EST24 may be identical or substantially identical to that of the emission stages EST11 to EST14 shown in FIG. 18, and therefore, overlapping descriptions may not be repeated.

Figure 22:
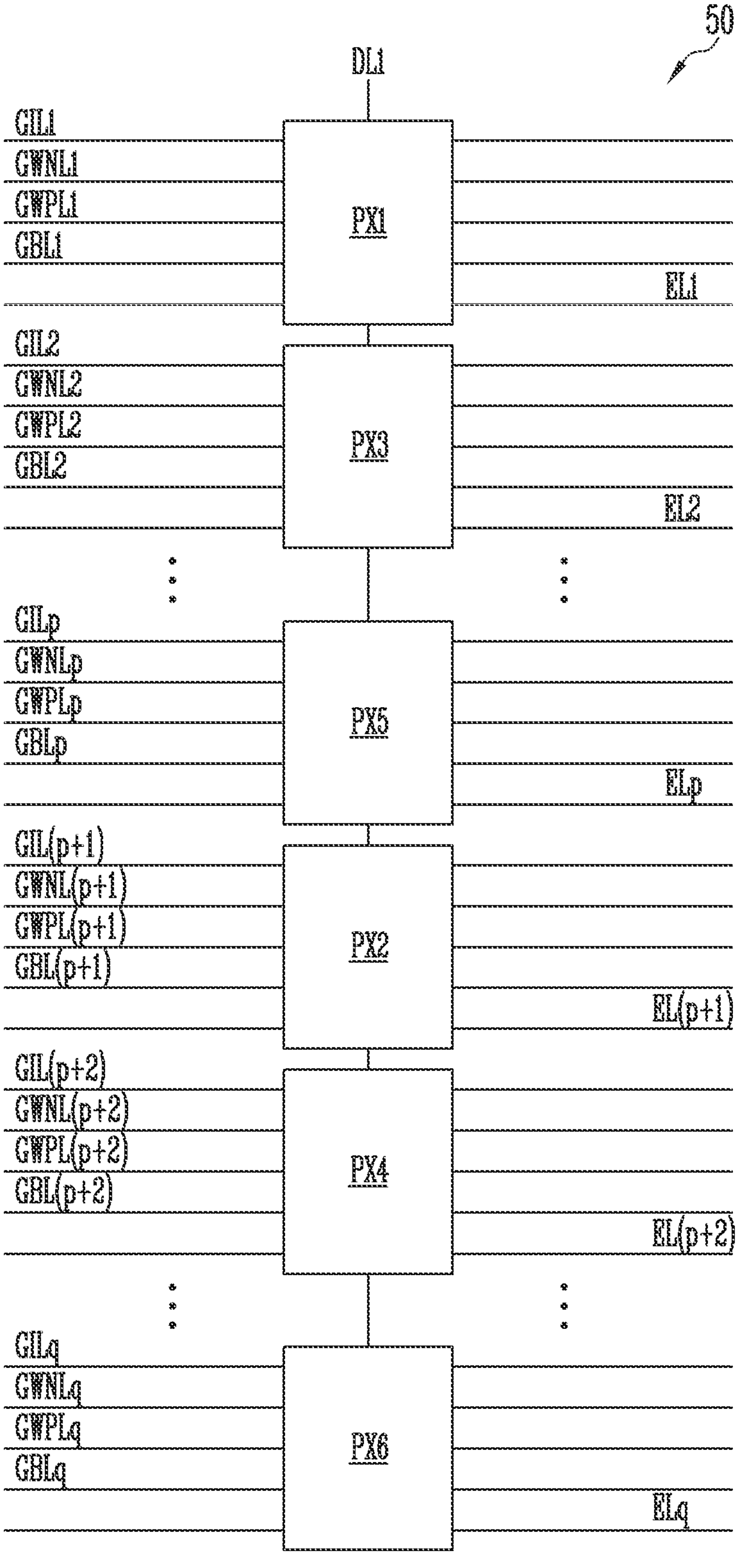
FIGS. 22 and 23 are diagrams illustrating a case where data write frames are consecutive.
Figure 23:
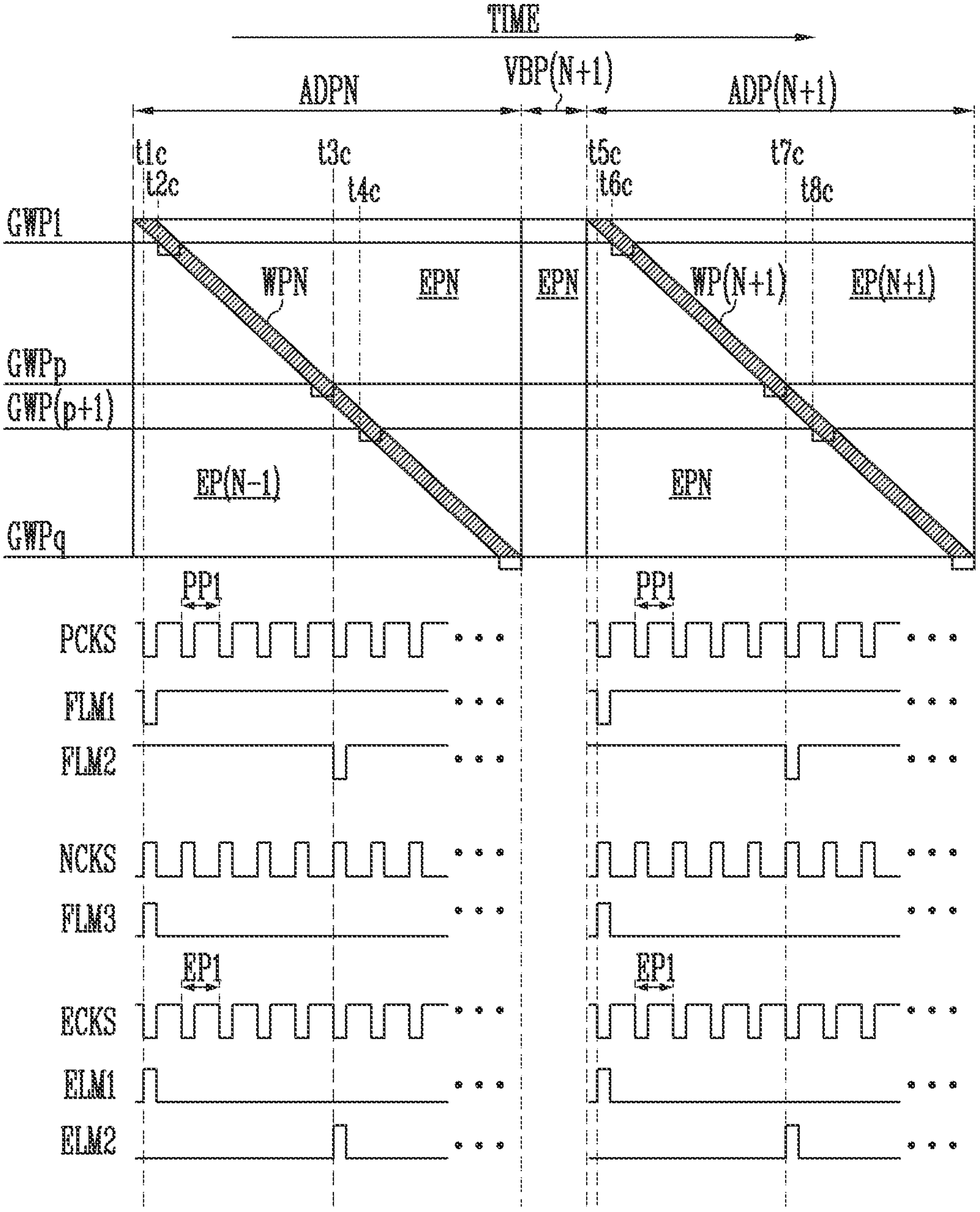

FIGS. 22 and 23 are diagrams illustrating a case where data write frames are consecutive.

Referring to FIG. 22, a plurality of pixels PX1 to PX6 connected to a first data line DL1 are illustrated as an example for convenience of description. For convenience of description, the plurality of pixels PX1 to PX6 are described based on the scan lines GWPL1, GWPL2, GWPLp, GWPL(p+1), GWPL(p+2), and GWPLq connected to the gate electrodes of the transistors T2 of the respective pixels PX1 to PX6 among the scan lines connected to the respective pixels PX1 to PX6. For example, the pixels PX1 to PX6 are described based on the scan lines GWPL1 to GWPLq connected to the first scan driver 30P1 and the second scan driver 30P2.

Hereinafter, a "first scan line" may mean a scan line for supplying a scan signal having a first turn-on level after the first scan start signal FLM1 having a turn-on level is generated among the scan lines connected to the first scan driver 30P1. In the embodiment shown in FIG. 22, the first scan line may mean a first scan line GWPL1. In addition, a "last scan line" may mean a scan line for supplying a scan signal having a last turn-on level after the second scan start signal FLM2 is generated among the scan lines connected to the second scan driver 30P2. In the embodiment shown in FIG. 22, the last scan line may mean a sixth scan line GWPLq. A "next scan line" of a reference scan line may mean a scan line for supplying a scan signal having a turn-on level at the closest time after (e.g., at the next time from among times at which scan signals are supplied to scan lines) a scan signal having a turn-on level is supplied to the reference scan line. A "previous scan line" of the reference scan line may mean a scan line for supplying a scan signal having a turn-on level at the closest time before (e.g., at the previous time from among times at which scan signals are supplied to scan lines) a scan signal having a turn-on level is supplied to the reference scan line. The above description is made based on a case where one pulse of a turn-on level is supplied in one frame including a data write period WP. When two or more pulses having a turn-on level are consecutively supplied to a scan line in each frame, the above description may be applied based on the last pulse.

A first pixel PX1 may be connected to the first data line DL1, the first scan line GWPL1, a first emission line EL1, and scan lines GIL1, GWNL1, and GBL1. The first scan line GWPL1 may be connected to the first scan driver 30P1. The first scan line GWPL1 may be a first scan line.

A second pixel PX2 may be connected to the first data line DL1, a second scan line GWPL(p+1), a second emission line EL(p+1), and scan lines GIL(p+1), GWNL(p+1), and GBL(p+1). The second scan line GWPL(p+1) may be connected to the second scan driver 30P2.

A third pixel PX3 may be connected to the first data line DL1, a third scan line GWPL2, a third emission line EL2, and scan lines GIL2, GWNL2, and GBL2. The third scan line GWPL2 may be connected to the first scan driver 30P1. The third scan line GWPL2 may be a next scan line of the first scan line GWPL1.

A fourth pixel PX4 may be connected to the first data line DL1, a fourth scan line GWPL(p+2), a fourth emission line EL(p+2), and scan lines GIL(p+2), GWNL(p+2), and GBL(p+2). The fourth scan line GWPL(p+2) may be connected to the second scan driver 30P2. The fourth scan line GWPL(p+2) may be a next scan line of the second scan line GWPL(p+1).

A fifth pixel PX5 may be connected to the first data line DL1, a fifth scan line GWPLp, a fifth emission line ELp, and scan lines GILp, GWNLp, and GBLp. The fifth scan line GWPLp may be connected to the first scan driver 30P1. The fifth scan line GWPLp may be a previous scan line of the second scan line GWPL(p+1).

A sixth pixel PX6 may be connected to the first data line DL1, the sixth scan line GWPLq, a sixth emission line ELq, and scan lines GILq, GWNLq, and GBLq. The sixth scan line GWPLq may be connected to the second scan driver 30P2. The sixth scan line GWPLq may be a last scan line.

The emission lines EL1, EL2, and ELp may be connected to the first emission driver 41. The emission lines EL(p+1), EL(p+2), and ELq may be connected to the second emission driver 42. The scan lines GWNL1, GWNL2, GWNLp, GWNL(p+1), GWNL(p+2), and GWNLq may be connected to the third scan driver 30N.

Referring to FIG. 23, example two frame period when the display device is driven in the first display mode are illustrated. A first frame period may sequentially include a first vertical blank period and a first active data period ADPN. A second frame period as a next frame period of the first frame period may sequentially include a second vertical blank period VBP(N+1) and a second active data period ADP(N+1).

An "active data period" may be a supply period of grayscale values constituting an image frame to be displayed by the pixel unit 50. A "vertical blank period" may be a transition period of an active data period of a previous image frame and an active data period of a current image frame. Clock training, frame setting, and dummy data supplying may be performed during the vertical blank period. A pulse of the above-described vertical synchronization signal may be generated during the vertical blank period, and may not be generated during the active data period. A pulse of the above-described horizontal synchronization signal may be generated in both the vertical blank period and the active data period.

Before a first data write period WPN, the pixels PX1 to PX6 may emit lights during an emission period EP(N−1), based on data voltages written in a previous data write period. The data write period and the emission period may be changed in a unit of a pixel row.

Based on each pixel row, the first active data period ADPN may sequentially include a first data write period WPN and a first emission period EPN. In the first data write period WPN, a data voltage may be sequentially written to the pixels PX1 to PX6. During the first emission period EPN, the pixel PX1 to PX6 may emit lights, based on the data voltages written in the first data write period WPN.

Clock training, frame setting, and dummy data supplying may be performed during the second vertical blank period VBP(N+1). In the second vertical blank period VBP(N+1), the pixels PX1 to PX6 may maintain an emission state, based on the data voltages written in the first data write period WPN.

Based on each pixel row, the second active data period ADP(N+1) may include a second data write period WP(N+1) and a second emission period EP(N+1). In the second data write period WP(N+1), a data voltage may be sequentially written to the pixels PX1 to PX6. During the second emission period EP(N+1), the pixels PX1 to PX6 may emit lights, based on the data voltages written in the second data write period WP(N+1).

A scan clock signal PCKS may mean a scan clock signal applied to a clock line among the scan clock lines PCKLS shown in FIG. 9. The scan clock signal PCKS may correspond to the first scan clock signal or the second scan clock signal, which are described above. The scan clock signal PCKS shown in FIG. 23 is simply illustrated to describe a first cycle PP1, and may have a waveform different from an actual waveform (e.g., from the waveform illustrated in FIG. 23).

A scan clock signal NCKS may mean a scan clock signal applied to a clock line among the scan clock lines NCKLS shown in FIG. 9. The scan clock signal NCKS shown in FIG. 23 is simply illustrated to describe whether the scan clock signal NCKS is to be supplied, and may have a waveform different from an actual waveform (e.g., the waveform illustrated in FIG. 23). Because it is necessary for the third scan driver 30N to sequentially supply a scan signal having a turn-on level during the data write periods WPN and WP(N+1), the scan clock signal NCKS having a turn-on level may also be supplied in a certain cycle.

An emission clock signal ECKS may mean an emission clock signal applied to a clock line among the emission clock lines ECKLS shown in FIG. 17. The emission clock signal ECKS may correspond to the first emission clock signal or the second emission clock signal, which are described above. The emission clock signal ECKS shown in FIG. 23 is simply illustrated to describe a third cycle EP1, and may have a waveform different from an actual waveform (e.g., from the waveform illustrated in FIG. 23).

At a time t1*c*, the first scan start signal FLM1 having a turn-on level may be supplied. The third scan start signal FLM3 having a turn-on level and the first emission stop signal ELM1 may be supplied to be synchronized with the supply of the first scan start signal FLM1 having the turn-on level.

At a time t2*c*, the scan stage PST11 may supply a first scan signal GWP1 having a turn-on level (low level).

At a time t3*c*, the second scan start signal FLM2 having a turn-on level may be supplied. The second emission stop signal ELM2 having a turn-off level may be supplied to be synchronized with the supply of the second scan start signal FLM2 having the turn-on level.

At a time t4*c*, the scan stage PST21 may supply a second scan signal GWP(p+1) having a turn-on level.

Operations of the scan driver 30 and the emission driver 40 at the above-described times t1*c*, t2*c*, t3*c*, and t4*c* of the first frame period are identical to those of the scan driver 30 and the emission driver 40 at times t5*c*, t6*c*, t7*c*, and t8*c* of the second frame period, and therefore, overlapping descriptions may not be repeated.

In the first frame period and the second frame period, the scan clock signal PCKS may have the first cycle PP1. Also, in the first frame period and the second frame period, the emission clock signal ECKS may have the third cycle EP1.

Figure 24:
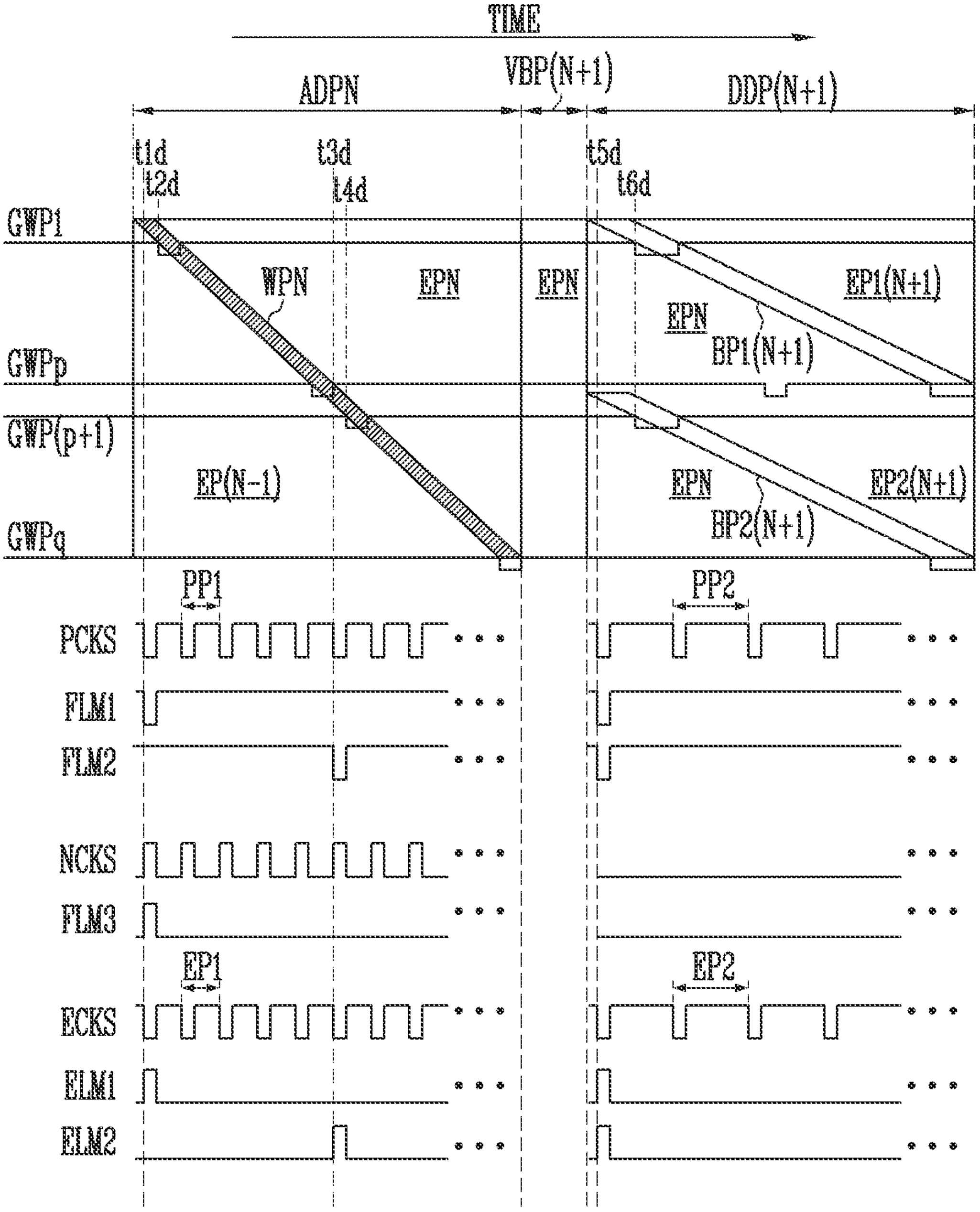
FIGS. 24 to 26 are diagram illustrating a case where a data write frame and a bias refresh frame are consecutive.
Figure 25:
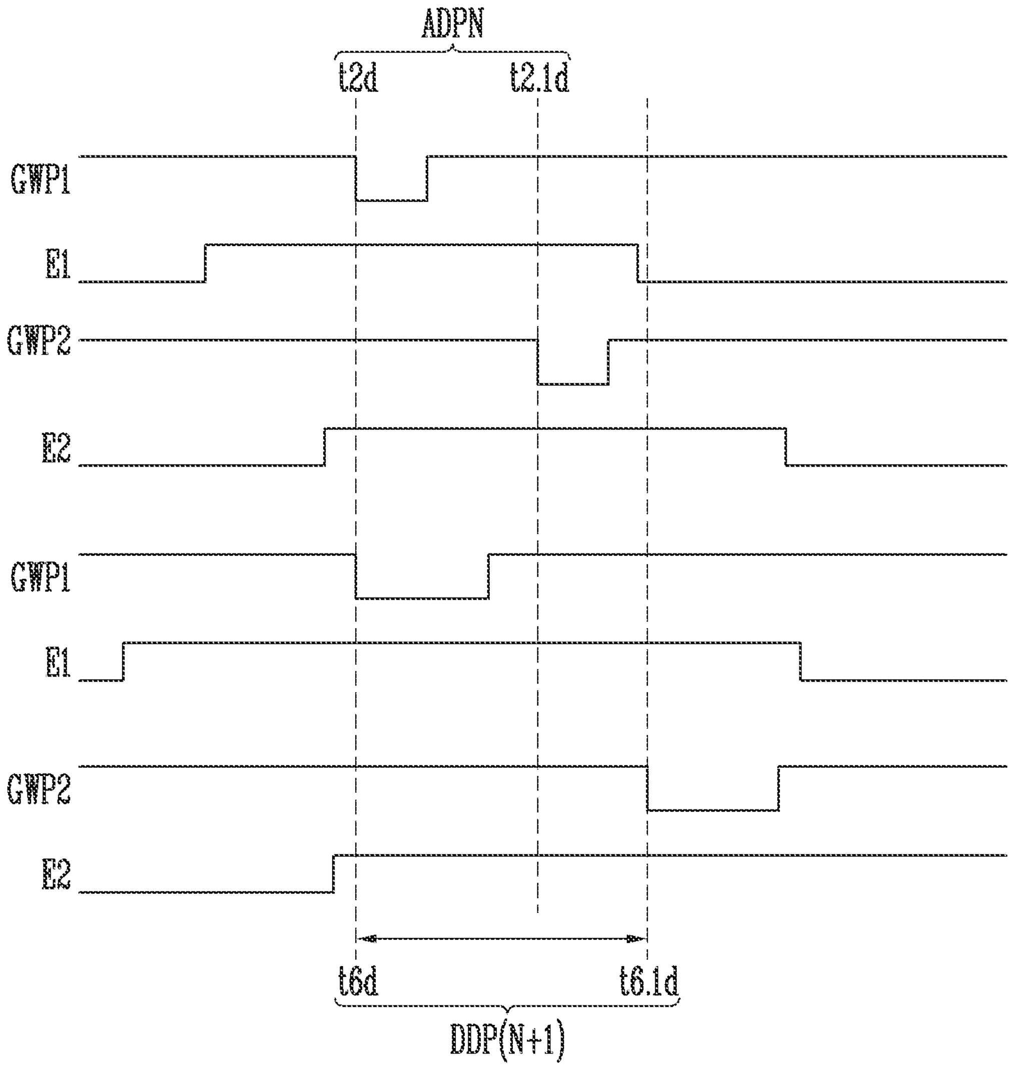
Figure 26:
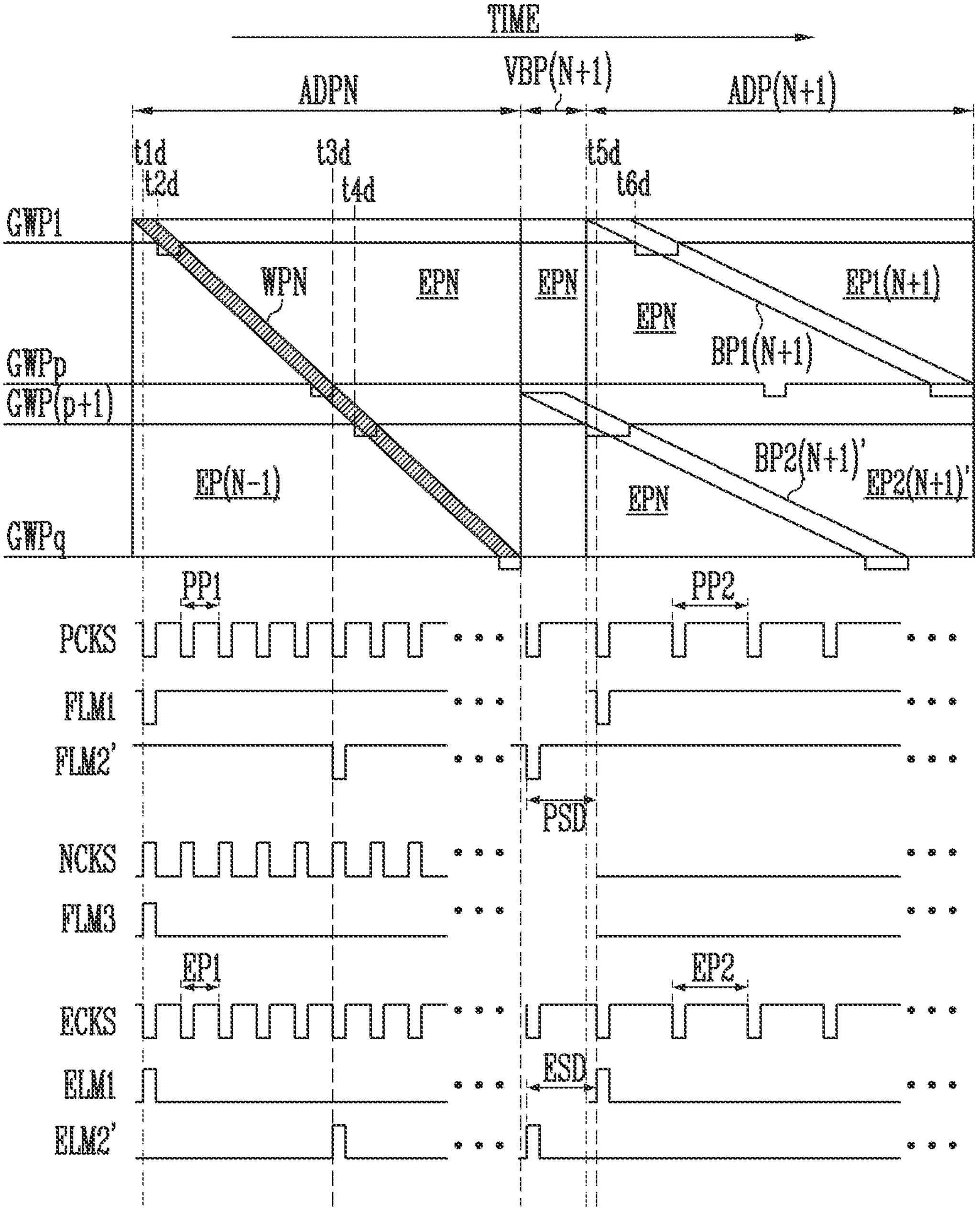

FIGS. 24 to 26 are diagrams illustrating a case where a data write frame and a bias refresh frame are consecutive.

Referring to FIG. 24, example two frame periods when the display device is displayed in the second display mode are illustrated. A first frame period may sequentially include a first vertical blank period and a first active data period ADPN. A second frame period as a next frame period of the first frame period may sequentially include a second vertical blank period VBP(N+1) and a second dummy data period DDP(N+1).

A "dummy data period" may correspond to an "active data period." For example, a length of the "dummy data period" may be equal to that of the "active data period" (e.g., equal to that of first active data period ADPN). However, grayscale values constituting an image frame may not be supplied in the "dummy data period."

Operations of the scan driver 30 and the emission driver 40 at times t1*d*, t2*d*, t3*d*, and t4*d* of the first frame period in the second display mode may be identical to those of the scan driver 30 and the emission driver 40 at the times t1*c*, t2*c*, t3*c*, and t4*c* of the first frame period in the first display mode, and therefore, overlapping descriptions may not be repeated. A difference between the time t3*d* at which the second start signal FLM2 having a turn-on level is supplied and the time t1*d* at which the first scan start signal FLM1 having a turn-on level is supplied may be defined as a first period.

When a number of pixels connected to the first data line DL1 between the first pixel PX1 and the second pixel PX2 is X, and a horizontal period is Y, the first period may correspond to (X+1)*Y.

In accordance with an embodiment of the present disclosure, in the second frame period, a difference between a time t5*d* at which the first scan start signal FLM1 having a turn-on level is supplied and the time t5*d* at which the second scan start signal FLM2 having a turn-on level is supplied may correspond to a second period. The second period may be shorter than the first period.

In the embodiment shown in FIG. 24, the first scan start signal FLM1 having a turn-on level and the second scan start signal FLM2 having a turn-on level may be concurrently or simultaneously supplied. For example, in the second frame period illustrated in FIG. 24, the first scan start signal FLM1 and the second scan start signal FLM2 may be concurrently or simultaneously supplied. Therefore, the second period may be 0 (0 s).

Based on each pixel row connected to the first scan driver 30P1, the second dummy data period DDP(N+1) may sequentially include a first bias refresh period BP1(N+1) and a first emission period EP1(N+1). In addition, based on each pixel row connected to the second scan driver 30P2, the second dummy data period DDP(N+1) may sequentially include a second bias refresh period BP2(N+1) and a second emission period EP2(N+1).

In accordance with this embodiment, at least portions of the first bias refresh period BP1(N+1) and the second bias refresh period BP2(N+1) may overlap with each other. In the embodiment shown in FIG. 24, the first bias refresh period BP1(N+1) and the second bias refresh period BP2(N+1) may be the same. Accordingly, the first emission period EP1(N+1) and the second emission period EP2(N+1) may be the same.

For example, in accordance with this embodiment, the first scan driver 30P1 and the second scan driver 30P2 may concurrently or simultaneously operate, and therefore, the scan clock signal PCKS may have a second cycle PP2. The second cycle PP2 may be longer than the first cycle PP1. For example, a frequency of the scan clock signal PCKS in the second frame period may be lower than that of the scan clock signal PCKS in the first frame period, and thus power consumption can be reduced.

Referring to the driving methods shown in FIGS. 7 and 8, the supply of the first emission stop signal ELM1 having a turn-off level is necessary to be synchronized with the supply of the first scan start signal FLM1 having a turn-on level. In addition, the supply of the second emission stop signal ELM2 having a turn-off level is necessary to be synchronized with the supply of the second scan start signal FLM2 having a turn-on level.

In the first frame period, a difference between a time at which the second emission stop signal ELM2 having a turn-off level is supplied and a time at which the first emission stop signal ELM1 having a turn-off level is supplied may be defined as a third period. Also, in the second frame period, a difference between a time at which the second emission stop signal ELM2 having a turn-off level is supplied and a time at which the first emission stop signal ELM1 having a turn-off level is supplied may be defined as a fourth period. The fourth period may be shorter than the third period.

For example, in accordance with this embodiment, the first emission driver 41 and the second emission driver 42 may concurrently or simultaneously operate, and therefore, the emission clock signal ECKS may have a fourth cycle EP2. The fourth cycle EP2 may be longer than the third cycle EP1. For example, a frequency of the emission clock signal ECKS in the second frame period may be lower than that of the emission clock signal ECKS in the first frame period, and thus power consumption can be reduced.

Referring to the driving methods shown in FIGS. 7 and 8, the third scan driver 30N supplies no scan signal having a turn-on level during the second frame period. Therefore, it is unnecessary for the third scan driver 30N to supply the scan clock signal NCKS having a turn-on level in a certain cycle during the second frame period. Also, the third scan driver 30N does not supply the third scan start signal FLM3 having a turn-on level during the second frame period.

Referring to FIG. 25, in the second display mode, a portion of the active data period ADPN and a portion of the dummy data period DDP(N+1) are compared with each other. For example, the active data period ADPN and the dummy data period DDP(N+1) may be compared based on times t2*d* and t6*d* at which the first scan signal GWP1 having a turn-on level is supplied.

In the first frame period, a difference between the time t2*d* at which the first scan signal GWP1 having a turn-on level is applied to the first scan line GWPL1 and a time t2.1*d* at which a third scan signal GWP2 having a turn-on level is applied to the third scan line GWPL2 may be defined as a third period.

Also, in the second frame period, a difference between the time t6*d* at which the first scan signal GWP1 having the turn-on level is applied and the time t6.1*d* at which the third scan signal GWP2 having the turn-on level is applied may be defined as a fourth period. The fourth period may be longer than the third period.

Such a driving feature is a phenomenon occurring as the second cycle PP2 of the scan clock signal PCKS, supplied to the first scan driver 30P1 and the second scan driver 30P2, is longer than the first cycle PP1.

Meanwhile, referring to FIGS. 22 and 24, in the first frame period, a time at which a fifth scan signal GWPp having a turn-on level is applied to the fifth scan line GWPLp may be earlier than the time t4*d* at which the second scan signal GWP(p+1) having a turn-on level is applied. Meanwhile, in the second frame period, the time at which the fifth scan signal GWPp having the turn-on level is applied may be later than the time t6*d* at which the second scan signal GWP(p+1) having the turn-on level is applied.

Referring to FIG. 26, there is illustrated a case where, in the second frame period, a second period PSD as a difference between a time at which the first scan start signal FLM1 having a turn-on level is supplied and a time at which a second scan start signal FLM2' having a turn-on level is supplied is not 0 (0 s).

For example, at least portions of the first bias refresh period BP1(N+1) and a second bias refresh period BP2(N+1)' may overlap with each other, but the first bias refresh period BP1(N+1) and the second bias refresh period BP2(N+1)' may not be completely the same (e.g., may not completely overlap). Accordingly, at least portions of second emission periods EP1(N+1) and EP2(N+1)' may overlap with each other, but the second emission periods EP1(N+1) and EP2(N+1)' may not be completely the same (e.g., may not completely overlap).

For example, a minimum value of the second period PSD may be 0 (0 s), and a maximum value of the second period PSD may correspond to the vertical blank period VBP(N+1). The second period PSD is set to the maximum value or less, so that the bias refresh periods BP1(N+1) and BP2(N+1) do not overlap with an adjacent data write period WPN.

Similarly, in the second frame period, a fourth period ESD as a difference between a time at which the first emission stop signal ELM1 having a turn-off level is supplied and a time at which a second emission stop signal ELM2' having a turn-off level is supplied may not be 0 (0 s).

In FIG. 26, a case where, in the second frame period, a time at which the second scan start signal FLM2' having a turn-on level is supplied is earlier than that at which the first scan start signal FLM1 having a turn-on level is supplied is illustrated. However, in another embodiment, the time at which the first scan start signal FLM1 having the turn-on level is supplied is earlier than that at which the second scan start signal FLM2' having the turn-on level is supplied. For example, the time at which the first scan start signal FLM1 having the turn-on level is supplied may occur during the second vertical blank period VBP(N+1).

Similarly, in FIG. 26, a case where, in the second frame period, the time at which the second emission stop signal ELM2' having the turn-off level is supplied is earlier than that at which the first emission stop signal ELM1 having the turn-off level is supplied is illustrated. However, in another embodiment, the time at which the first emission stop signal ELM1 having the turn-off level is supplied may be earlier than that at which the second emission stop signal ELM2' having the turn-off level is supplied. For example, the time at which the first emission stop signal ELM1 having the turn-off level is supplied may occur during the second vertical blank period VBP(N+1).

In the display device and the driving method thereof in accordance with the present disclosure, the frequency of clock signals is controlled according to the kind of a frame, so that power consumption can be reduced.

Example embodiments have been disclosed herein, and although example terms are employed, they are used and are to be interpreted in a generic and descriptive sense only and not for purpose of limitation. In some instances, as would be apparent to one of ordinary skill in the art as of the effective filing of the present application, features, characteristics, and/or elements described in connection with one embodiment may be utilized separately or in combination with features, characteristics, and/or elements described in connection with another embodiment(s) unless otherwise specifically indicated. Accordingly, it will be understood by those of skill in the art that various suitable changes in form and details may be made without departing from the spirit and scope of the present disclosure as set forth in the following claims and equivalents thereof.

What is claimed is:

1. A display device comprising:

a first scan driver connected to a first scan start line and first scan lines;

a second scan driver connected to a second scan start line and second scan lines; and pixels connected to the first scan lines and the second scan lines, wherein a pixel of the pixels comprises:

a first transistor;

a second transistor comprising a first electrode connected to a data line, a second electrode connected to a first electrode of the first transistor, and a gate electrode connected to a respective one of the first scan lines; and a third transistor comprising a first electrode connected to a gate electrode of the first transistor, a second electrode connected to a second electrode of the first transistor, and a gate electrode connected to a respective one of the second scan lines, wherein, in a first period of a low frequency driving mode, the second scan start line is to be supplied with a second scan start signal having a turn-on level and a first scan start signal having a turn-on level is to be supplied to the first scan start line, wherein, in a second period of the low frequency driving mode, the second scan start line is to be supplied with the second scan start signal maintaining a turn-off level and the first scan start signal having the turn-on level is to be supplied to the first scan start line, and wherein the second period is after the first period.

2. The display device of claim 1, wherein the second transistor is a poly-silicon transistor, and wherein the third transistor is an oxide semiconductor transistor.

3. The display device of claim 1, wherein the pixel further comprises:

a light emitting diode;

a fourth transistor comprising a first electrode connected to the gate electrode of the first transistor, a second electrode connected to an initialization line, and a gate electrode connected to a third scan line;

a fifth transistor comprising a first electrode connected to a first power line, a second electrode connected to the first electrode of the first transistor, and a gate electrode connected to an emission line;

a sixth transistor comprising a first electrode connected to the second electrode of the first transistor, a second electrode connected to an anode of the light emitting diode, and a gate electrode connected to the emission line; and a seventh transistor comprising a first electrode connected to the initialization line, a second electrode connected to the anode of the light emitting diode, and gate electrode connected to a fourth scan line.

4. The display device of claim 3, wherein the first, second, fifth, sixth, and seventh transistors are poly-silicon transistors, and wherein the third and fourth transistors are oxide semiconductor transistors.

5. The display device of claim 3, further comprising:

a third scan driver connected to a third scan start line and third scan lines comprising the third scan line; and a fourth scan driver connected to a fourth scan start line and fourth scan lines comprising the fourth scan line.

6. The display device of claim 1 wherein, in the first period, a first scan clock signal supplied to the first scan driver has a first cycle, and wherein, in the second period, the first scan clock signal has a second cycle longer than the first cycle.

7. The display device of claim 6, wherein, in the first period, a second scan clock signal supplied to the second scan driver has the first cycle, and wherein, in the second period, the second scan clock signal maintains the turn-off level.

8. The display device of claim 7, further comprising:

a first emission driver connected to a first emission stop line and first emission lines; and a second emission driver connected to a second emission stop line and second emission lines, wherein each of the pixels further comprises a transistor connected to a respective one of the first emission lines and or of the second emission lines, wherein, in the first period, the second emission stop line is to be supplied with a second emission stop signal having a turn-off level, after a third period elapses after a first emission stop signal having a turn-off level is supplied to the first emission stop line, wherein, in the second period, a difference between a time at which the first emission stop signal having the turn-off level is supplied and a time at which the second emission stop signal having the turn-off level is supplied corresponds to a fourth period, and wherein the fourth period is shorter than the third period.

9. The display device of claim 8, wherein, in the first period, a first emission clock signal supplied to the first emission driver has a third cycle, wherein, in the second period, the first emission clock signal has a fourth cycle longer than the third cycle.

10. The display device of claim 9, wherein, in the first period, a second emission clock signal supplied to the second emission driver has the third cycle, wherein, in the second period, the second emission clock signal has the fourth cycle.

* * * * *